United States Patent [19]

Shichinohe et al.

[11] Patent Number: 5,934,234
[45] Date of Patent: Aug. 10, 1999

[54] ASSEMBLY STRUCTURE OF A SHAFT HAVING A FIXED SPROCKET

[75] Inventors: Takashi Shichinohe; Sumiko Fukuzawa, both of Saitama, Japan

[73] Assignee: Honda Giken Kogyo Kabushiki Kaisha, Tokyo, Japan

[21] Appl. No.: 08/957,785

[22] Filed: Oct. 24, 1997

Related U.S. Application Data

[60] Provisional application No. 60/029,475, Oct. 24, 1996.

[51] Int. Cl.⁶ ............................................. F01L 1/04
[52] U.S. Cl. ........................ 123/90.31; 123/90.6; 74/567; 29/888.01
[58] Field of Search ........................... 123/90.27, 90.31, 123/90.6; 74/567; 29/888.01, 888.1

[56] References Cited

U.S. PATENT DOCUMENTS

| | | | |
|---|---|---|---|
| 4,395,980 | 8/1983 | Tominaga et al. | 123/90.31 |
| 4,996,768 | 3/1991 | Seyller | 29/888.01 |
| 5,687,680 | 11/1997 | Shichinohe et al. | 123/90.6 |
| 5,704,315 | 1/1998 | Tsuchida et al. | 123/90.6 |

FOREIGN PATENT DOCUMENTS 8028236  1/1996  Japan.

*Primary Examiner*—Weilun Lo
*Attorney, Agent, or Firm*—Birch, Stewart, Kolasch & Birch, LLP

[57] ABSTRACT

A shaft having a sprocket fixed at one end thereof is reliably assembled to the supporting wall of an engine, with a reduced number of parts and man-hours required for assembly. A camshaft having a sprocket fixed at one end thereof is installed by engaging a pair of ball bearings with supporting holes on supporting walls of the engine. A crescent-shaped step partially cut in the loosing direction of an endless chain is formed on one supporting hole. An outer race of one ball bearing on the camshaft is engaged with the step. An endless chain is wound around the sprocket, and the one ball bearing is moved into the supporting hole, and the other ball bearing is correctly engaged with the other supporting hole, thereby completing assembly of the camshaft.

10 Claims, 30 Drawing Sheets

ASSEMBLY STRUCTURE OF A SHAFT HAVING A FIXED SPROCKET

This application is a nonprovisional conversion application of provisional application Ser. No. 60/029,475, filed on Oct. 24, 1996, the entire contents of which are hereby incorporated by reference.

BACKGROUND OF THE INVENTION

1. Field of the Invention

The present invention relates to a structure for permitting installation of a shaft to a supporting wall of an engine, and more particularly, to permitting installation of a shaft having a sprocket and a pair of bearings preassembled therewith.

2. Description of the Background Art

In the conventional method of installing a camshaft in an engine as disclosed in FIG. 13 of Japanese Patent Laid-Open No. Hei 8-28236, a camshaft is first installed in the engine casing with a bearing therebetween. Thereafter, a sprocket on which an endless chain is entrained is brought into contact with a flange that is formed on the end of the camshaft, and the sprocket is fastened to the camshaft with a bolt.

However, the above-mentioned conventional assembling structure requires bolts for fastening the sprocket to the camshaft, thus increasing the number of parts and man-hours required for completely installing the camshaft.

On the other hand, if the sprocket were preassembled with the camshaft of the conventional arrangement in an attempt to avoid the above problem, damage can occur between the sprocket and the endless chain when assembling the components.

SUMMARY OF THE INVENTION

Accordingly, it is an object of the present invention to provide a structure and a method for installing a shaft having a sprocket preassembled therewith to the supporting wall, while minimizing the number of parts and man-hours required for assembly.

This and other objects of the present invention are fulfilled by a camshaft having a pair of ball bearings and a sprocket mounted thereon. Then, the ball bearing on the sprocket side is brought into engagement with a stepped portion of a support hole formed in the support wall and is held there temporarily. Then, the ball bearing located on the side opposite to the sprocket side is disengaged from a support hole formed in the support wall, allowing the camshaft to be inclined with respect to a crankshaft of the engine, to decrease the distance between the sprocket ends of the respective shafts. This allows a silent chain to be entrained on the sprocket in an untensioned state. Thereafter, the ball bearing located on the sprocket side is moved to disengage its outer race from the stepped portion and bring it into exact engagement with the support hole. At the same time, the ball bearing located on the side opposite to the sprocket side is brought into exact engagement with the support hole formed in the support wall. Thus, assembling of the camshaft in the casing is completed, and the number of components and the number of mounting steps is reduced in comparison with the case where a sprocket and endless transmission means are mounted to a shaft after the shaft has been installed in the first and second supporting holes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
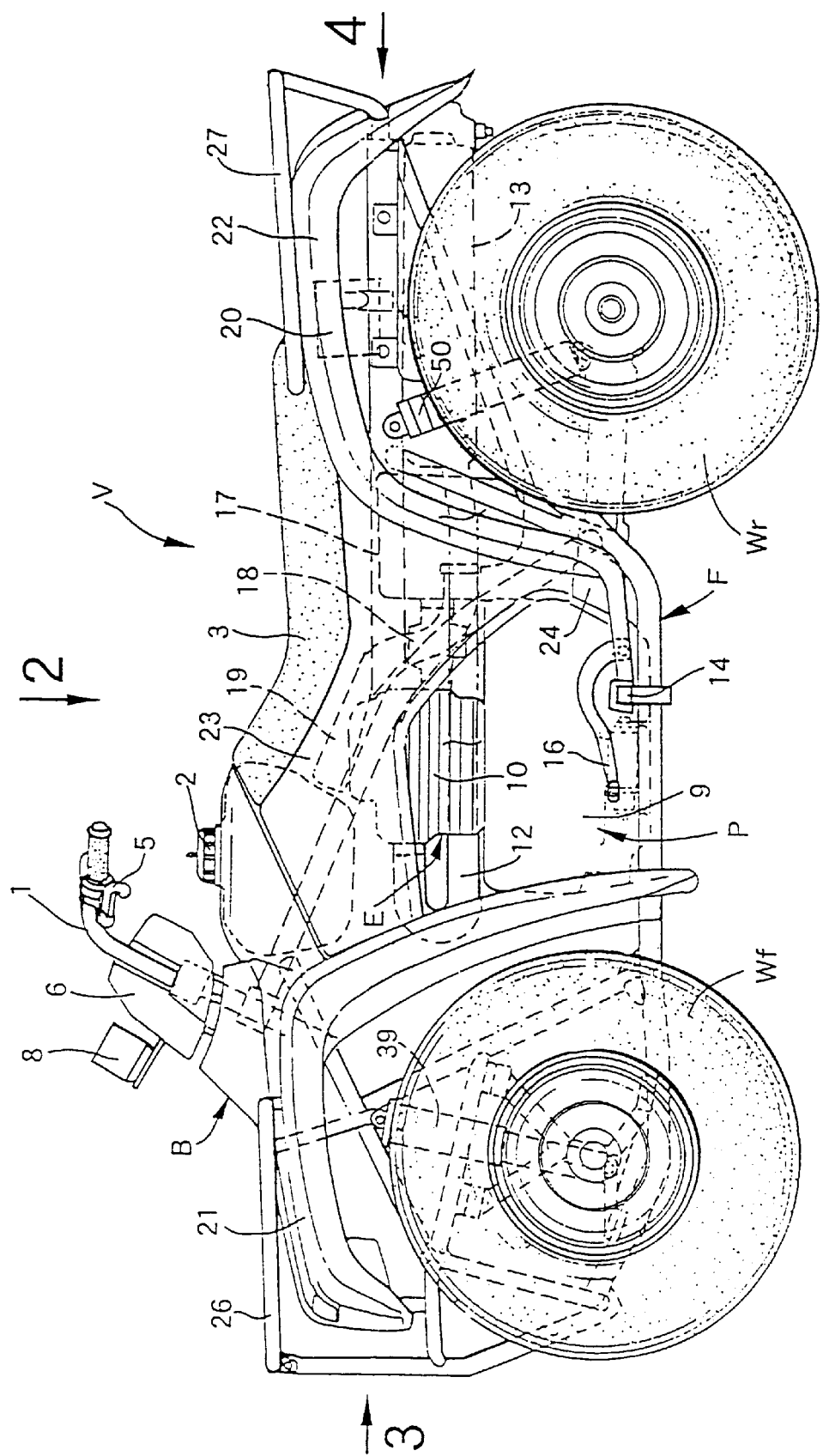
FIG. 1 is a left side view of a saddle-seat vehicle.
Figure 2:
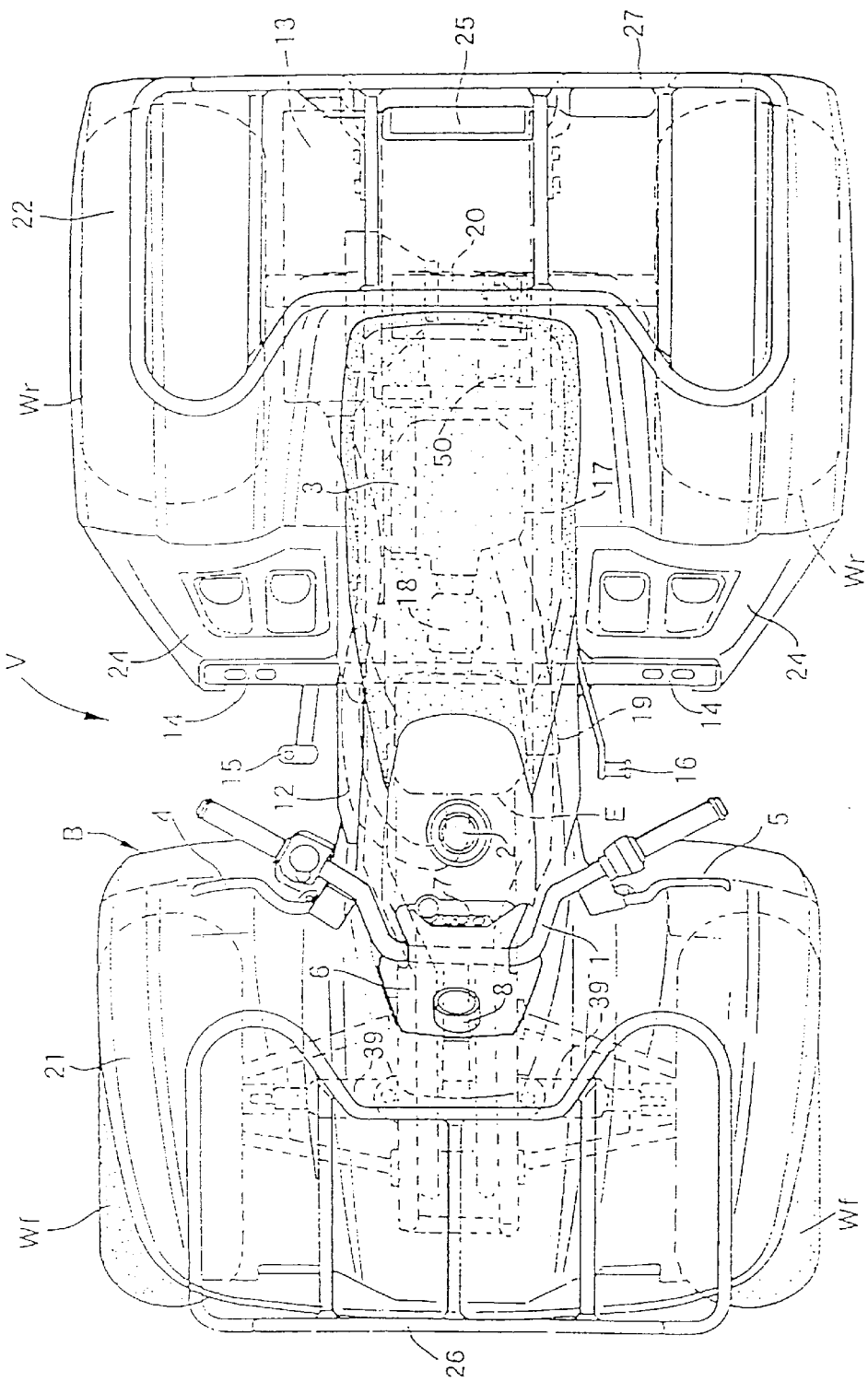
FIG. 2 is a plan view of the saddle-seat vehicle.

Referring in detail to the drawings, and with particular reference to FIGS. 1 to 7, the body structure of a saddle-seat vehicle V is shown.

The saddle-seat vehicle V is provided with a body frame F formed by welding and assembling steel pipes. A pair of right and left front wheels Wf,Wf and a pair of right and left rear wheels Wr,Wr are suspended from front and rear portions, respectively, of the body frame F. A balloon type low-pressure tire is mounted onto each of those wheels. A steering handle 1, a fuel tank 2 and a saddle seat 3 are arranged on the body frame F. A brake lever 4 is disposed at the rightmost end of the steering handle 1, and a brake lever 5 is disposed at the leftmost end of the steering handle 1. The brake lever 5 is utilized as a reverse shift lever only when a reverse pin is depressed. The central portion of the steering handle 1 is covered with a handle cover 6. Various indicators 7 are provided at the rear portion of the handle cover 6. A meter 8 is projectingly provided on the front portion of the handle cover 6.

A power unit P is mounted on the central portion of the body frame F below both the fuel tank 2 and the saddle seat 3. The power unit P includes an engine E for driving the right and left rear wheels Wr,Wr. The power unit P includes a casing 9 which serves as both a crankcase and a transmission case. A cylinder block 10 extends upwardly from the casing 9. A crankshaft 11 (see FIGS. 8 and 9) is supported by the casing 9, and is disposed in the longitudinal direction of the vehicle body. The cylinder block 10 is inclined toward the right side of the vehicle body relative to the vertical direction (see FIG. 4). An exhaust pipe 12 is connected to the front face of the cylinder block 10. The exhaust pipe 12 is curved rightwardly, and then extends rearwardly of the vehicle body along the right side face of the cylinder block 10. The exhaust pipe 12 is connected to a muffler 13 disposed on the righthand side of the rear portion of the vehicle body.

Step bars 14,14 for supporting both feet of a rider are fixed to the body frame F across the underside of the power unit P. A brake pedal 15 is provided adjacent the right-hand step bar 14, while a change pedal 16 is provided adjacent the left-hand step bar 14. An air cleaner 17 is disposed behind and above the power unit P. The air cleaner 17 is connected through a carburetor 18 to the back of the cylinder block 10 of the engine E. An intake duct 19 of the air cleaner 17 extends obliquely forward along the left side face of the vehicle body and its front end opens to the rear portion of the fuel tank 2. A battery 20 for supplying electric power to various electric devices is mounted on the rear portion of the vehicle body.

A body B is formed of a synthetic resin and is supported by the body frame F. The body B includes a front fender 21 which covers an area extending from above the right and left front wheels Wf,Wf to a location above the fuel tank 2. The body B further includes a rear fender 22 which covers an area extending from above the right and left rear wheels Wr,Wr. A pair of right and left first side covers 23,23 connect the front fender 21 and the rear fender 22 with each other. The pair of right and left first side covers 23,23 cover the side faces of the vehicle body below the seat 3. A pair of right and left second side covers 24,24 are connected to right and left front portions of the rear fender 22.

A tail lamp 25 is provided at the rear end of the rear fender 22. A front carrier 26 and a rear carrier 27 are provided above the front fender 21 and the rear fender 22, respectively. The underside of the power unit P is protected by an underguard 28 (see FIG. 6). The underguard 28 is a metallic plate having a large number of holes therein.

Figure 3:
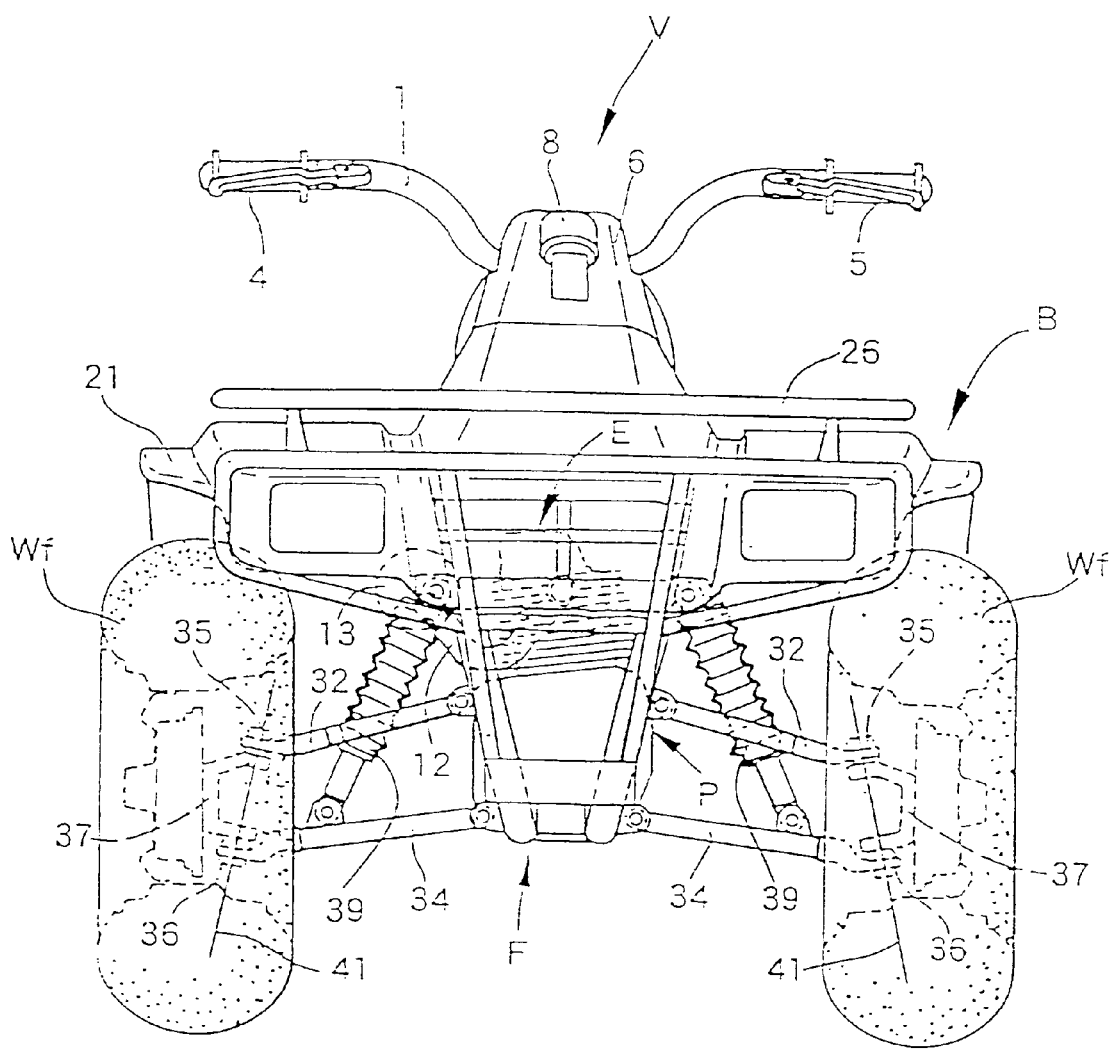
FIG. 3 is a front view of the saddle-seat vehicle.
Figure 4:
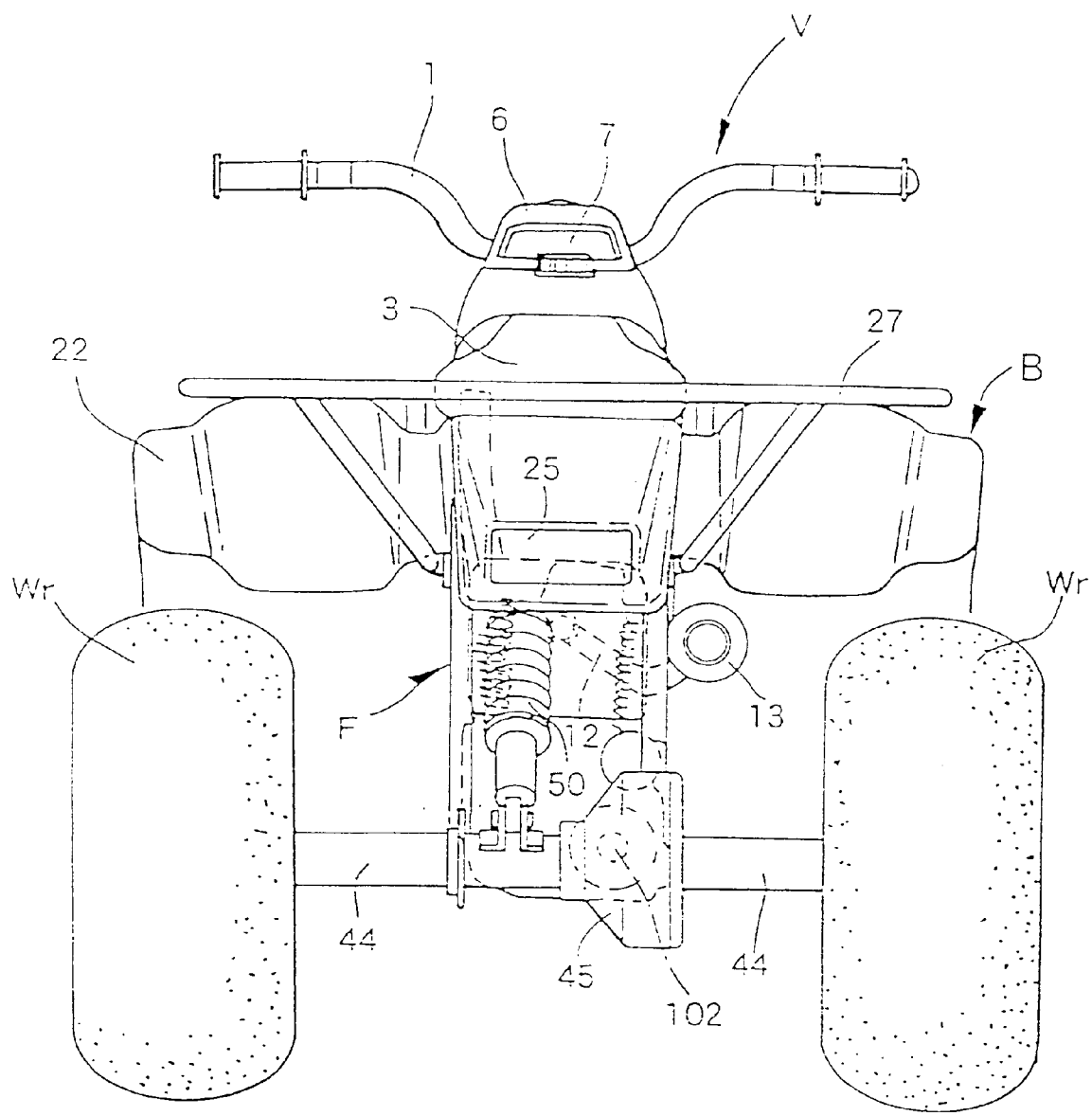
FIG. 4 is a rear view of the saddle-seat vehicle.
Figure 5:
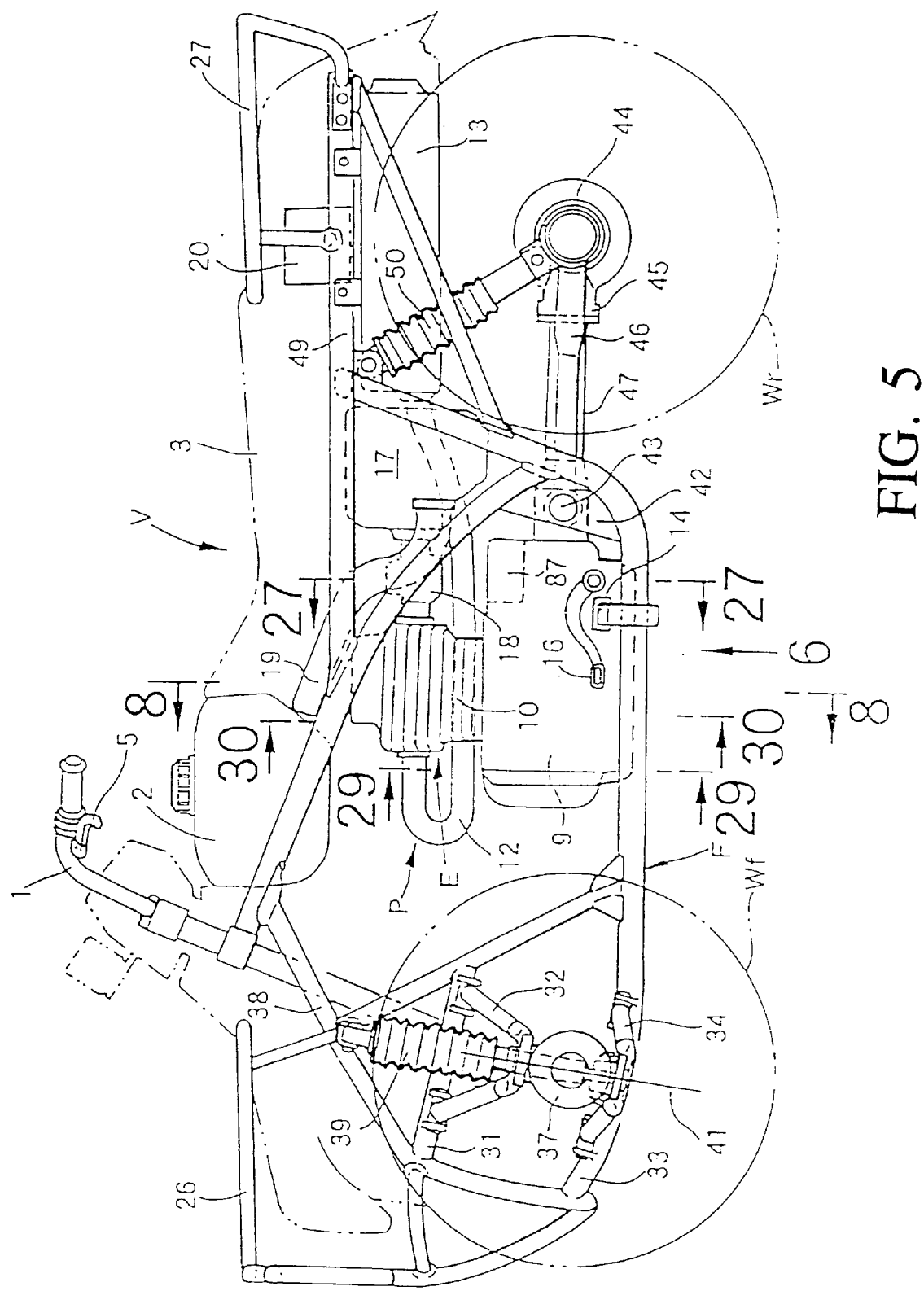
FIG. 5 is a left side view of the saddle-seat vehicle with its body removed.
Figure 6:
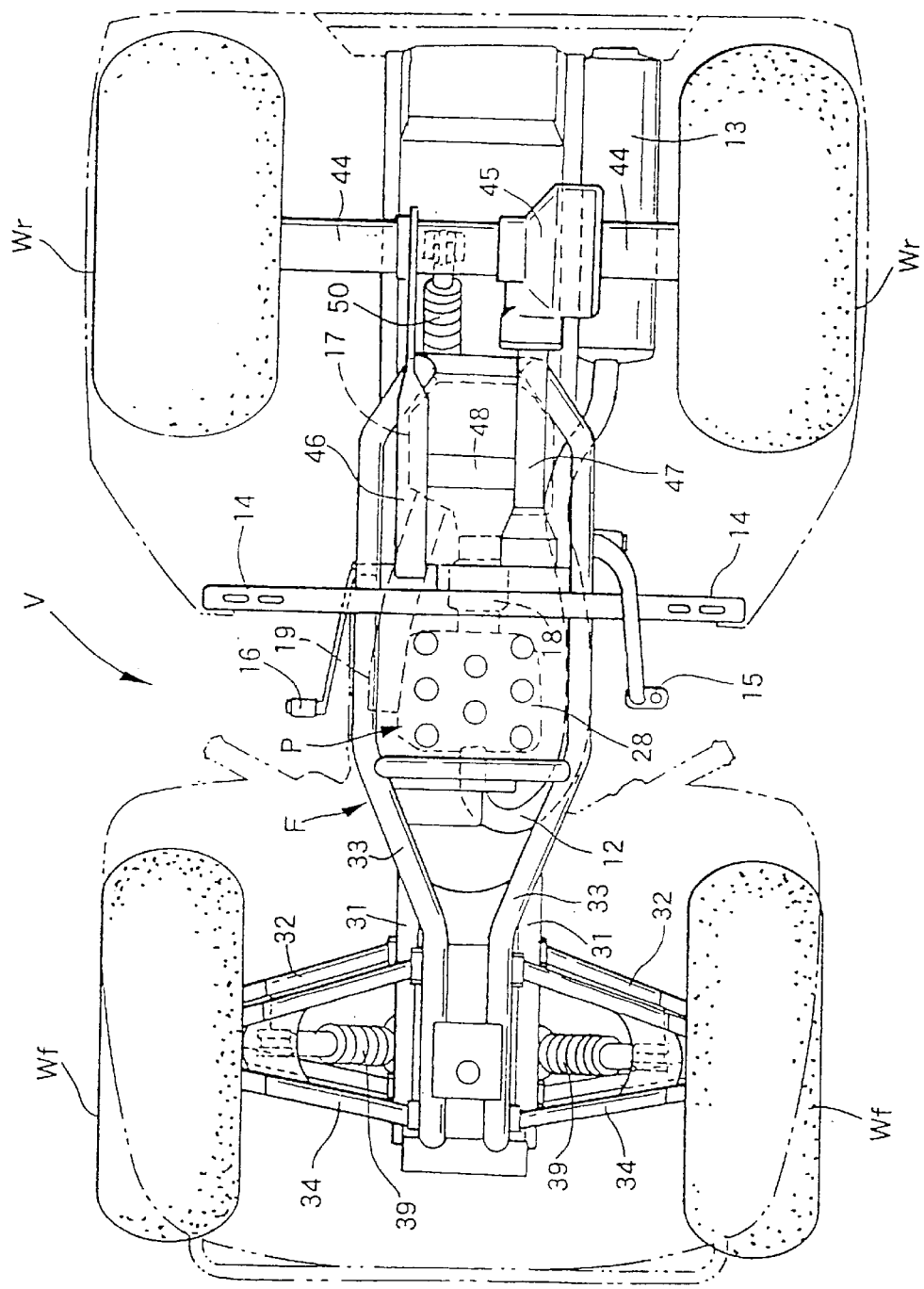
FIG. 6 is a bottom view of the saddle-seat vehicle with its body removed.

As shown in FIGS. 3 and 5, the vehicle includes a double wishbone type front suspension having a symmetric structure. The right and left portions are each provided with an upper arm 32 whose base end is pivotally connected to a frame member 31, and a lower arm 34 whose base end is pivotally connected to a frame member 33. A pair of knuckles 37 are pivotally connected to the distal ends of the upper arms 32 and the lower arms 34 through upper and lower ball joints 35, 36, respectively. A pair of front cushions 39 are connected at the lower ends thereof to the lower arms 34, and at the upper ends thereof to a frame member 38. Integral with the knuckles 37 are a pair of knuckle arms (not shown) which are interlocked with the steering handle 1 through a link mechanism. Upon turning of the steering handle 1, the knuckles 37 turn together with the associated front wheels Wf about the respective axes 41 extending through the upper and lower ball joints 35,36.

Figure 7:
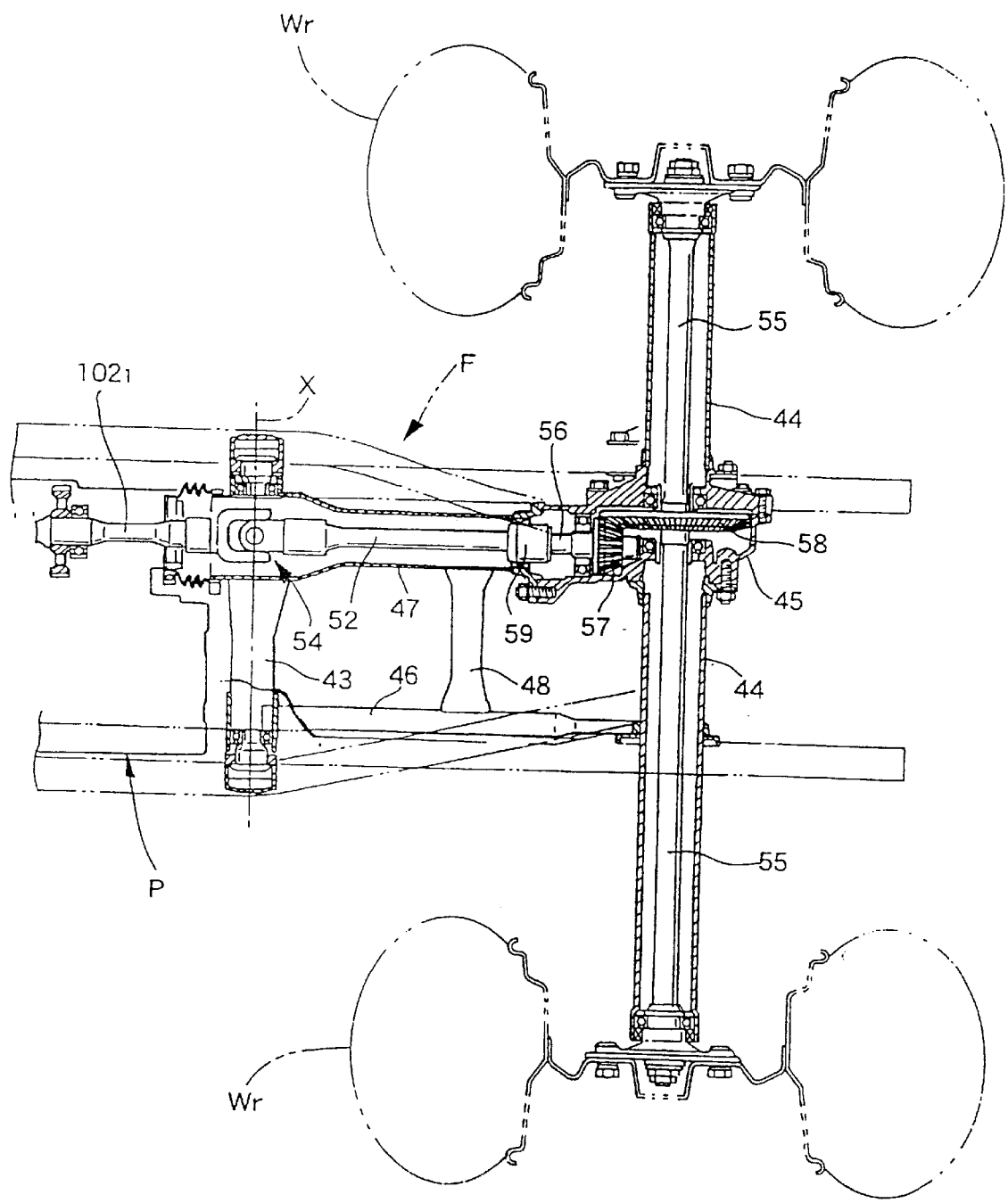
FIG. 7 is an enlarged sectional view of a principal portion of FIG. 2.

As shown in FIGS. 5 and 7, a rear suspension includes a pivot pipe 43 rotatably supported at both ends thereof by frame members 42,42. A left arm pipe 46 connects the left end portion of the pivot pipe 43 to a left-hand axle case 44. A right arm pipe 47 connects the right end portion of the pivot pipe 43 to a gear housing 45. The gear housing 45 is located between the right and left axle cases 44,44. A cross member 48 interconnects the left arm pipe 46 with the right arm pipe 47 for reinforcement. A rear cushion 50 is connected between a frame member 49 and the gear housing 45. The right arm pipe 47 is larger in diameter than the left arm pipe 46, with a propeller shaft 52 extending through the hollow portion of the right arm pipe 47. A universal joint 54 connects the rear end of a transmission output shaft $102_1$ to the forward end of the propeller shaft 52. The universal joint 54 is located such that its pivotal center is positioned on a rotational axis X (see FIG. 7) of the pivot pipe 43. Therefore, when the left and right arm pipes 46,47 rotate about the axis X together with the pivot pipe 43, the propeller shaft 52 can bend at the universal joint 54, and thus the power is effectively transmitted to the rear wheels Wr,Wr.

A pair of rear axles 55,55 are supported within the axle cases 44,44, and the rear wheels Wr,Wr are connected to outward ends of the rear axles 55,55. An input shaft 56 having a bevel pinion gear 57 is rotatably supported by the gear housing in an interior thereof. A bevel ring gear 58 located in the interior of the gear housing 45 is meshed with the pinion gear 57 and is connected to each of the rear axles 55,55. The rear end of the propeller shaft 52 is connected to the forward end of the input shaft 56, whereby the rotation of the propeller shaft 52 is transmitted through the pinion and ring gears 57,58 and to the rear axles 55,55 to drive the rear wheels Wr,Wr.

The power unit P will now be described with particular reference to FIGS. 8 to 10. The power unit P includes an engine E and a transmission T integral with each other. More specifically, the crankcase of the engine E and the transmission case of the transmission T are united as a common casing 9. Mounting bosses 71,71 are formed on both sides of the lower portion of the casing 9 and are each connected to the body frame F through an elastic mounting member. The casing 9 is provided with a front casing 121, a rear casing 122, a front cover 214 and a rear cover 215. Alternatively, the casing 9 may instead be divided into right and left casings. A recoil starter cover 216 is connected to the rear cover 215.

The engine E includes a cylinder block 10 having a cylinder 72 located in the interior thereof. The cylinder block 10 includes a large number of cooling fins $10_1$ formed on the exterior thereof. A cylinder head 73 is coupled to the upper end face of the cylinder block 10. A piston 74 is adapted to slide within the cylinder 72. The crankshaft 11 is connected to the piston 74 through a connecting rod 75. A camshaft 77 is driven and decelerated by the crankshaft 11 through a silent chain 76. The crankshaft 11 and the camshaft 77 are supported by the casing 9 which is connected to the lower end of the cylinder block 10.

Intake and exhaust valves $78i,78o$ for opening and closing intake and exhaust ports, respectively, are provided in the cylinder head 73, along with rocker arms $79i,79o$ for opening and closing these valves. The rocker arms $79i$ and $79o$ are driven by the camshaft 77 through push rods $80i,80o$. A spark plug 211 is disposed in the cylinder head 73 at a position close to the left hand side of the vehicle body. A head cover 212 is connected to the upper end of the cylinder head 73.

Figure 8:
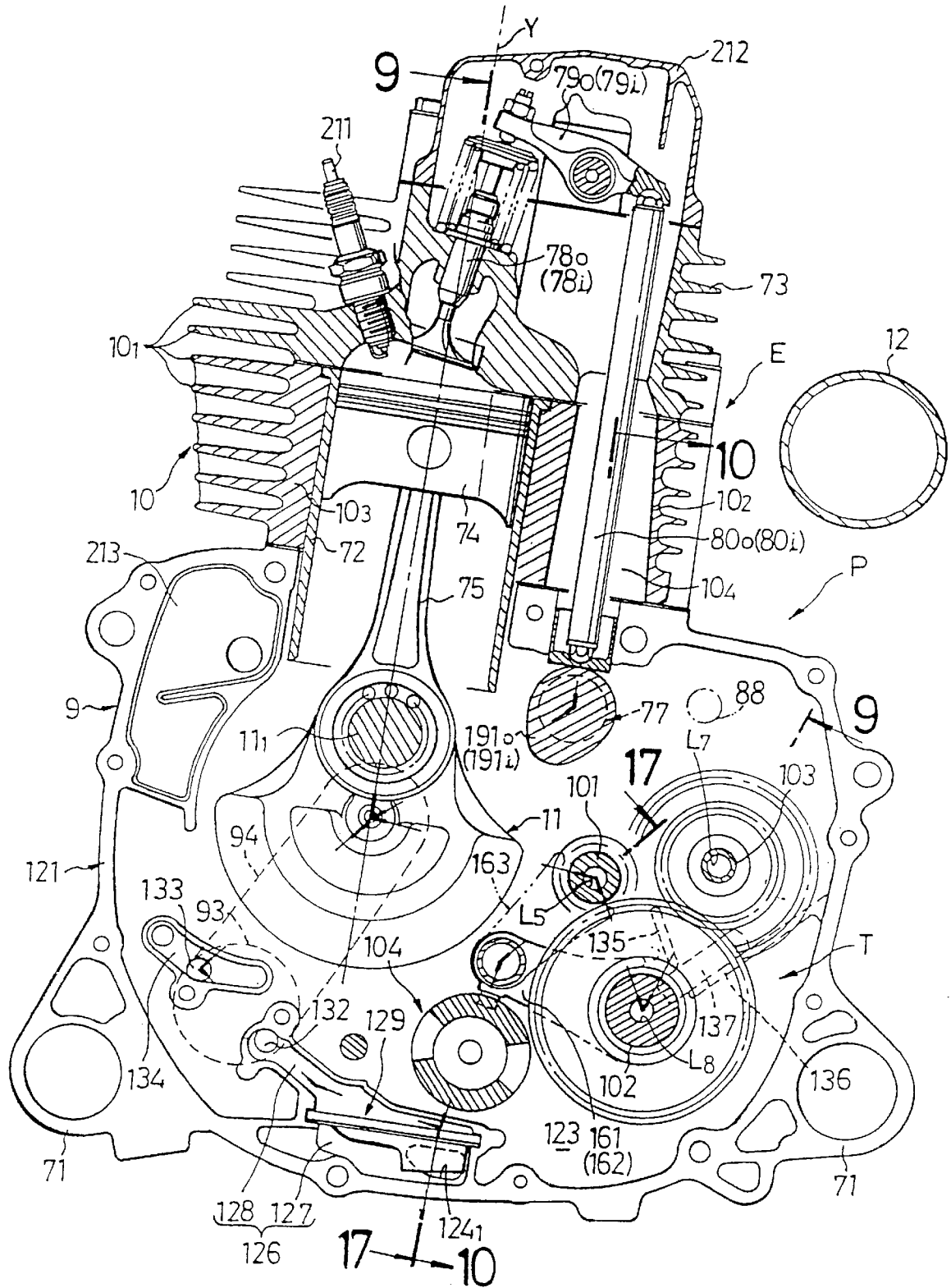
FIG. 8 is an enlarged sectional view taken along line 8—8 in FIG. 5.

As shown in FIG. 8, the crankshaft 11 is disposed in such a manner that both ends thereof face in the longitudinal direction of the vehicle. The cylinder block 10 is disposed in such a manner that its cylinder axis Y is inclined toward the transmission T disposed on one side of the crankshaft 11, and more specifically, toward the right side of the vehicle body. Further, the exhaust pipe 12 is disposed in close proximity to a right side wall $10_2$ of the cylinder block 10. A push rod receiving space $10_4$ is formed vertically in the interior of the right side wall $10_2$, and push rods $80i,80o$ are received in the push rod receiving space $10_4$. A breather chamber 213 is located in the casing 9 adjacent the left side thereof.

The right side wall $10_2$ of the cylinder block 10 has less ventilation capacity because the vertical space is small. On the other hand, the left side wall $10_3$ of the cylinder block 10 has more ventilation capacity because the vertical space is large. Thus, the left side wall $10_3$ has a significant influence on the cooling effect of the cylinder block 10. Therefore, if an exhaust pipe 12 and push rods $80i,80o$ were to be located on the left side wall $10_3$ of the cylinder block, the heat generated from the exhaust pipe 12 and the push rod containing space $10_4$ which reduces heat conductivity would reduce the cooling effect of the cylinder block 10. However, in this example, because the exhaust pipe 12 and the push rods $80i,80o$ are located on the right side wall $10_2$ which has less effect on the cooling of the cylinder block 10, the influence of these factors are minimized and the cooling efficiency of the whole engine E is enhanced. In this example, six cooling fins $10_1$ are provided on the left side wall $10_3$, and five cooling fins $10_1$ are provided on the right side wall $10_2$.

A rotor 82 of a generator 81 is fixed to the rear end portion of the crankshaft 11, and a stator 83 of the generator is fixed to the casing 9. A starting gear 85 having a large diameter is rotatably supported by the crankshaft 11 at a position adjacent to the rotor 82. The starting gear 85 is connected to the rotor 82 through a one-way clutch 86. Further, the starting gear 85 is connected through reduction gears 89 to an output shaft 88 of a starter motor 87 mounted outside of the casing 9. The reduction gears 89 comprise a plurality of idler gears carried on two idler shafts $89_1$ and $89_2$. Therefore, once the starting gear 85 is driven by operation of the starter motor 87, it is possible to start cranking of the crankshaft 11 through the one-way clutch 86 and the rotor 82. Upon start-up of the engine E, the one-way clutch is released to cut off the rotation transfer from the rotor 82 to the starting gear 85.

A starter ring 90 is fixed to the rearmost end of the crankshaft 11, and a recoil starter 91 engagable with the starter ring 90 is mounted to the casing 9. Thus, it is also possible to rotate the crankshaft 11 by pulling a rope of the recoil starter 91.

A centrifugal starting clutch 92 is attached to the front end of the crankshaft 11. An oil pump 93 located in the lower portion of the front casing 121 is driven by the crankshaft 11 through a silent chain 94.

The transmission T includes a main shaft 101, a counter shaft 102 and a reverse shaft 103. The shafts 101,102,103 are supported by the casing 9 in parallel with the crankshaft 11. More specifically, the main shaft 101 is supported by the front casing 121 and the rear casing 122 through a pair of ball bearings 217,217. The counter shaft 102 is supported by the front casing 121 and the rear casing 122 through a pair of ball bearings 218,218. The shafts 101,102,103 are located below the camshaft 77 and on the same side as the camshaft 77 with respect to the crankshaft 11. More particularly, the main shaft 101 is disposed below and on the right-hand side of the crankshaft 11, the counter shaft 102 is disposed below and on the right-hand side of the main shaft 101, and the reverse shaft 103 is disposed above and on the right-hand side of the counter shaft 102.

A shift drum 104 is disposed below and on the right-hand side of the crankshaft 11, and also below and on the left-hand side of the main shaft 101. The shift drum 104 is operated by the change pedal 16.

Because the camshaft 77, main shaft 101 and counter shaft 102 are all located in the casing 9 on the right-hand side of the vehicle body, only partial strengthening of the casing 9 to withstand the concentration of the mass of rotational parts and rotational bearings is necessary. In other words, it is possible to reduce the weight of the other components and thereby attain a reduction in weight of the engine E as a whole. Further, oil dropping from the push rod receiving space $10_4$ formed in the cylinder block 10 has a positive effect as lubricating oil on the camshaft 77, the main shaft 101 and the counter shaft 102, thereby enhancing the lubricating effect.

A vehicle speed sensor 95 is provided at the end portion of the counter shaft 102. The vehicle speed sensor 95 detects the vehicle speed based on the number of revolutions of the counter shaft 102. The vehicle speed sensor 95 is bolted to a counter shaft protector 96 through a heat insulator 97 made of bakelite or similar material. The protector 96 is attached to the rear face of the rear casing 122. The vehicle speed sensor 95 detects projections $102_2$ formed on the outer periphery of the rear portion of the counter shaft 102. A seal member 98 is located between the counter shaft protector 96 and the rear casing 122. The inside diameter of the counter shaft protector 96 on the rear casing 122 side is smaller than the diameter of the seal member 98. This arrangement prevents the oil present in the transmission T from entering the counter shaft protector 96, and hence the vehicle speed sensor 95 can be kept dry.

A multiple disc speed change clutch 105 is mounted on one end of the main shaft 101. An input member 106 of the speed change clutch 105 and an output member 107 of the starting clutch 92 are interconnected through reduction gears 108. The clutch 105 is engaged and released by the change pedal 16.

Speed change gear trains $109_1$ to $109_5$ from first gear to fifth gear are arranged between the main shaft 101 and the counter shaft 102. The speed change gear trains $109_1$ to $109_5$ selectively interconnect the main shaft 101 with the counter shaft 102 in accordance with the operation of the shift drum 104 to transfer rotation of the main shaft 101 to the counter shaft 102. The rear end of the counter shaft 102 projects rearwardly from the casing 9, and the front end of the propeller shaft 52 is connected to an output portion $102_1$ formed at the rear end of the counter shaft 102.

Figure 14:
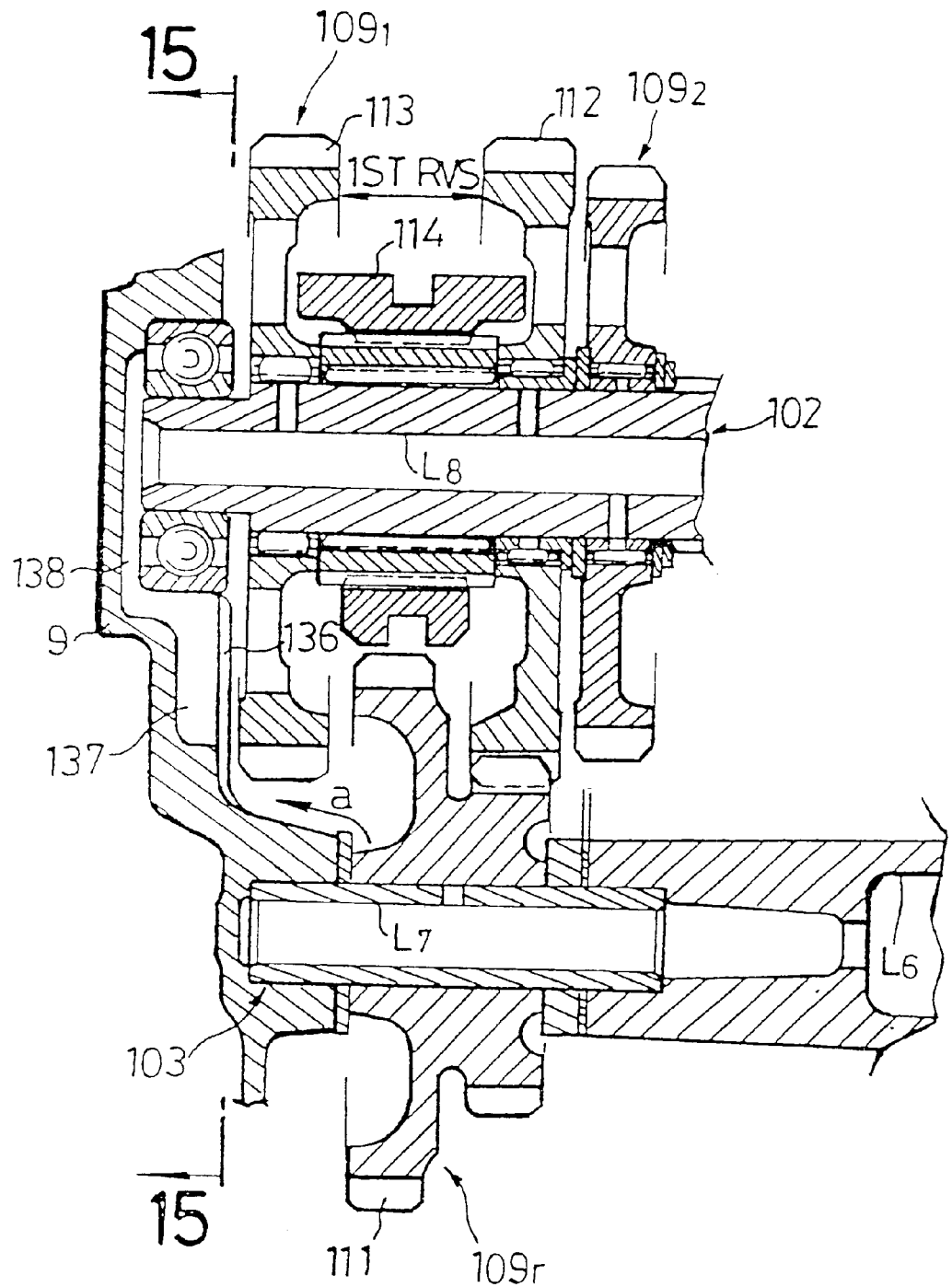
FIG. 14 is an enlarged view of a principal portion of FIG. 9.

Referring now to FIG. 14 in combination with the above figures, a reverse gear train $109_r$ is disposed over the area including the main shaft 101, the counter shaft 102 and the reverse shaft 103. The reverse gear train $109_r$ comprises a driving gear 110 (see FIG. 9) formed on the main shaft 101, a stepped idler gear 111 carried rotatably on the reverse shaft 103, and a driven gear 112 carried rotatably on the counter shaft 102 and meshing with the driving gear 110 through the idler gear 111. A dog clutch 114 is splined onto the counter shaft 102 in a position between a driven gear 113 of the low gear train $109_1$ and a driven gear 112 of the reverse gear train $109_r$. The dog clutch 114 is slidable along the splined portion of the counter shaft 102. The first gear train $109_1$ is established by bringing the dog clutch 114 into engagement with the driven gear 113, while the reverse gear train $109_r$ is established by engagement of the dog clutch 114 with the driven gear 112.

The following detailed descriptions are now provided for various components of the power unit P. First, the lubrication system for the power unit P will be described with reference to FIGS. 8 to 16.

Figure 10:
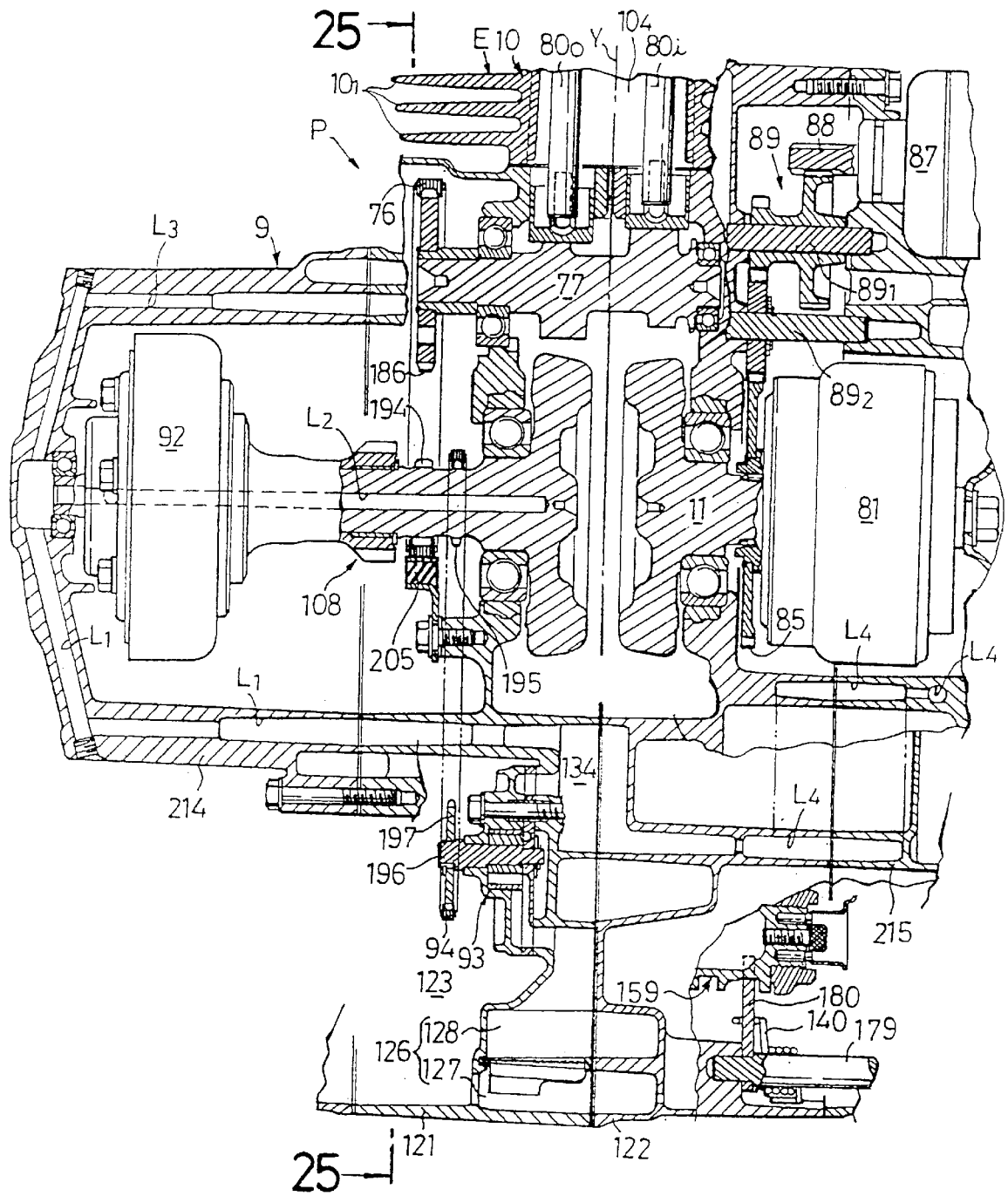
FIG. 10 is a sectional view taken along line 10—10 in FIG. 8.
Figure 11:
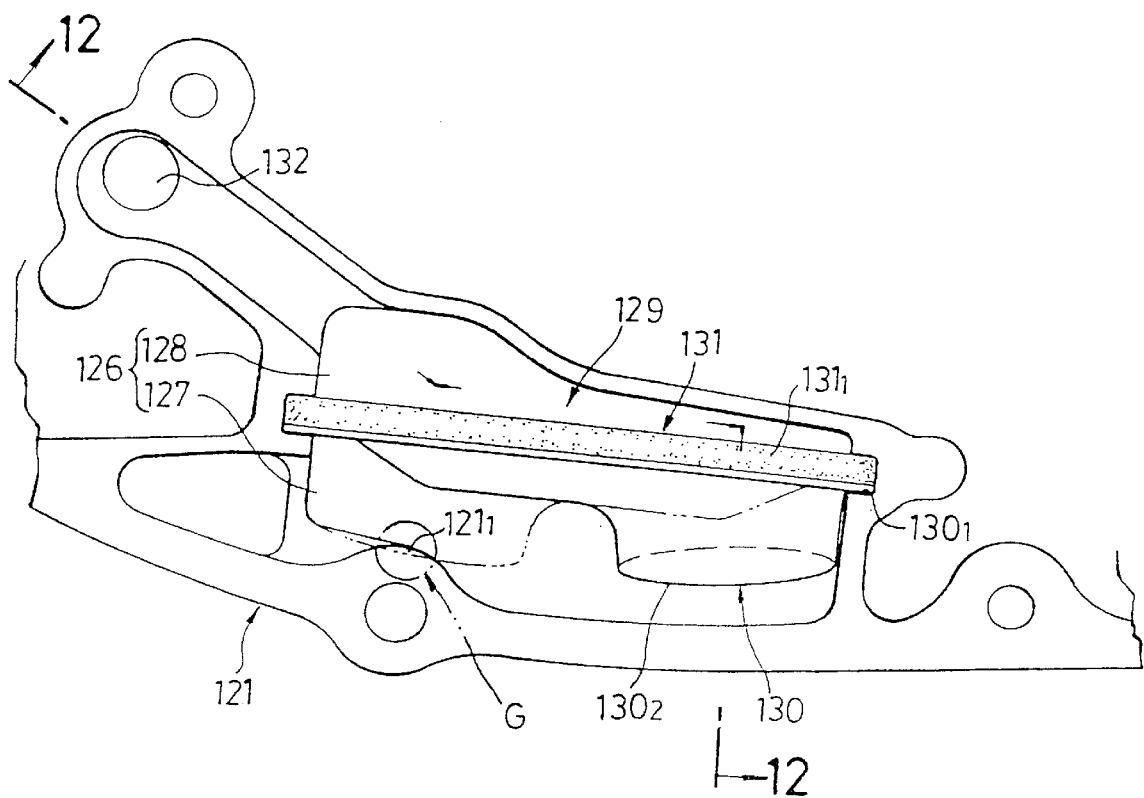
FIG. 11 is an enlarged view of a principal portion of FIG. 8.
Figure 12:
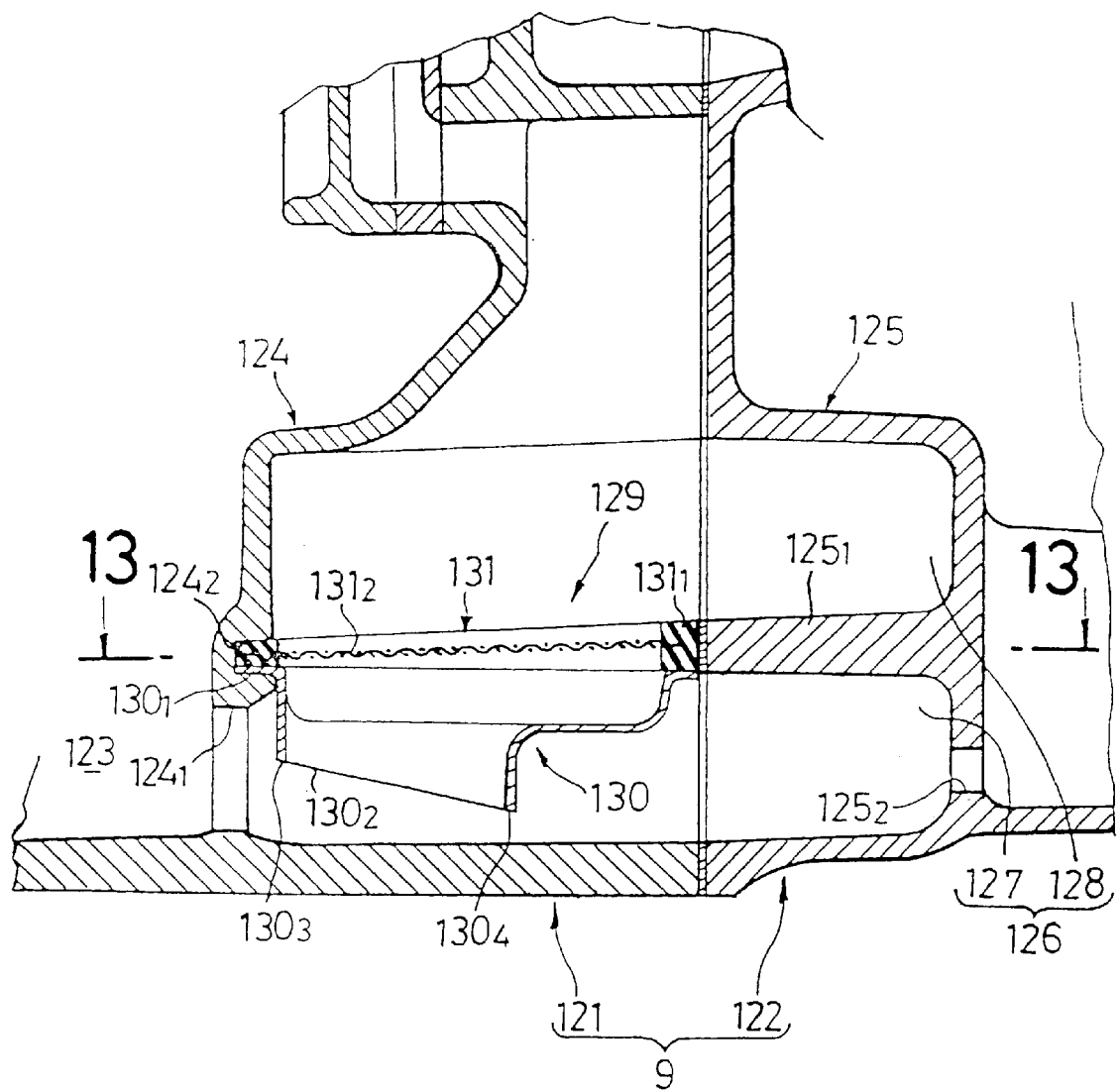
FIG. 12 is a sectional view taken along line 12—12 in FIG. 11.
Figure 13:
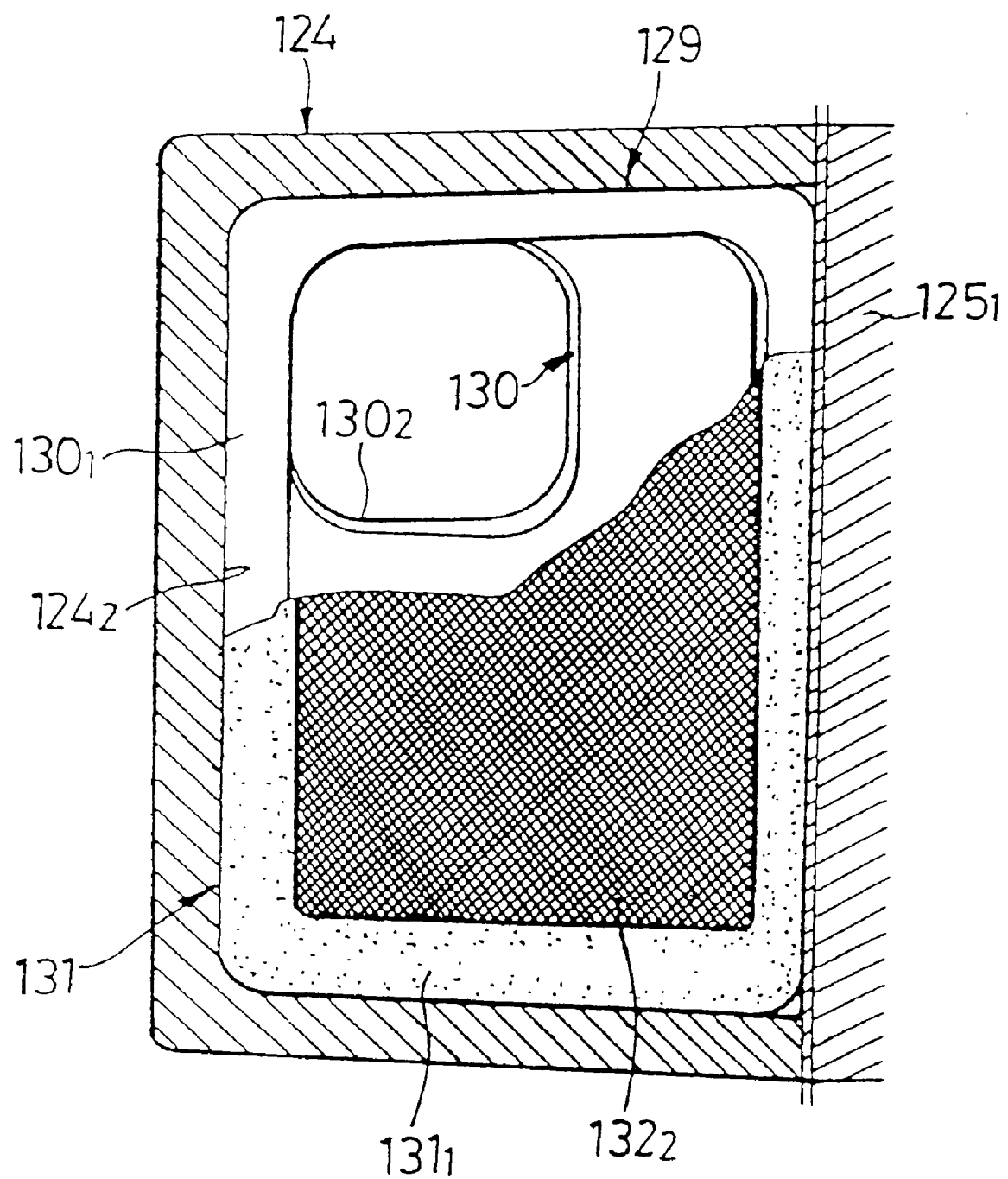
FIG. 13 is a sectional view taken along line 13—13 in FIG. 12.

As shown in FIGS. 11 to 13, the casing 9 comprises the front casing 121 and the rear casing 122 which are divided longitudinally on both sides of the cylinder axis Y (see FIG. 10). In an oil pan portion 123 formed at the bottom of the casing 9, an oil intake space 126 is defined by partition walls 124, 125 which are formed in the vicinity of mating surfaces of the front casing 121 and the rear casing 122. The oil intake space 126 is partitioned into a lower oil chamber 127 and an upper oil chamber 128 by means of a horizontally extending partition wall $125_1$ formed on the partition wall 125 of the rear casing 122. A front intake port $124_1$ which communicates with the interior of the front casing 121 is formed in the front wall of the lower oil chamber 127. A rear intake port $125_2$ communicating with the interior of the rear casing 122 is formed in the rear wall of the lower oil chamber 127. Both intake ports $124_1$, $125_2$ are formed so that the cross-sectional area of the front intake port $124_1$ is larger than the cross-sectional area of the rear intake port $125_2$. This is because oil is apt to remain in the bottom of the front casing 121 since the starting clutch 92 and the speed change clutch 105 are located on the front casing 121 side, and it is desirable to efficiently suck the oil into the oil intake space 126.

A slot $124_2$ is formed in the inner periphery of the partition wall 124 of the front casing 121. Alternatively, the slot $124_2$ may be formed in both of the front and rear partition walls 124,125, or it may be formed in the rear partition wall 125. The partition wall 124 is formed in a squared U-shape in horizontal section. An oil strainer 129 is fitted in the slot $124_2$. The oil strainer 129 comprises an intake duct 130 formed by press-working a metallic plate and a screen 131. The intake duct 130 is provided on the outer periphery thereof with a horizontally projecting flange portion $130_1$ and an intake port $130_2$ which opens downward. The screen 131 comprises a support frame $131_1$ formed of rubber and a mesh-like screen body $131_2$ stretched inside the support frame $131_1$.

The support frame $131_1$ of the screen 131 is fitted on the upper surface of the flange portion $130_1$ of the intake duct 130. In this state, both are inserted from the rear into the slot $124_2$ formed in the partition wall 124 of the front casing 121. Thereafter, the rear casing 122 is coupled to the front casing 121. As a result, the partition wall $125_1$ of the rear casing 122 comes into close contact with the rear edge of the flange portion $130_1$ and that of the support frame $131_1$, whereby the oil strainer 129 and the screen 131 are fixed in place.

As shown in FIG. 12, the intake port $130_2$ of the intake duct 130 is inclined so that a front side $130_3$ thereof is positioned higher than a rear side $130_4$ thereof which is lower. This arrangement facilitates the intake of oil from the front casing 121 side where a large amount of oil is stored.

Because the oil strainer 129 is contained in the oil intake space 126 partitioned by the partition walls 124, 125, intake of high-temperature oil dropping from the upper portion of the engine E directly to the oil pump 93 is prevented, and therefore the cooling performance of the engine E is enhanced.

Since the oil strainer 129 can be mounted to the casing 9 by merely inserting the intake duct 130 and the screen 131 in a superimposed state into the slot $124_2$ of the front casing 121, and subsequently coupling the rear casing 122 to the front casing 121, assembly of the structure is very easy. Because the intake duct 130 and the screen 131 are formed as separate members, the same screen 131 can be used with a plurality of different intake ducts 130, which leads to enhanced versatility.

Because the starting clutch 92 and the speed change clutch 105 are disposed in the front portion of the engine E, the amount of oil returning to the front casing 121 becomes larger than that of oil returning to the rear casing 122. However, since the cross-sectional area of the front intake port $124_1$ formed in the partition wall 124 on the front side of the oil intake space 126 is larger than the cross-sectional area of the rear intake port $125_2$ formed in the partition wall on the rear side of the oil intake space 126, both the oil from the front casing 121 and the oil from the rear casing 122 can be returned effectively into the oil intake space 126. Though the quantity of oil remaining in the front casing 121 side is more than the quantity of oil remaining in the rear casing 122 side, bubbling or intake of air is prevented when the engine E is inclined in the forward or rearward direction because the intake port $130_2$ of the intake duct 130 is positioned toward the front side relative to the mating surfaces of the front and rear casings 121,122.

The intake duct 130 has a simple structure that can be formed by press-working a metallic plate. Therefore, not only can the intake duct 130 be fabricated at low cost, but also the shape thereof can be modified easily.

As indicated by a broken line in FIG. 11, if an attempt is made to incorrectly mount the intake duct 130 in a front-rear reversed state, the intake duct 130 interferes at location G with an interference portion $121_1$ projecting from the inner surface of the front casing 121, so that improper mounting of the intake duct is prevented.

Figure 9:
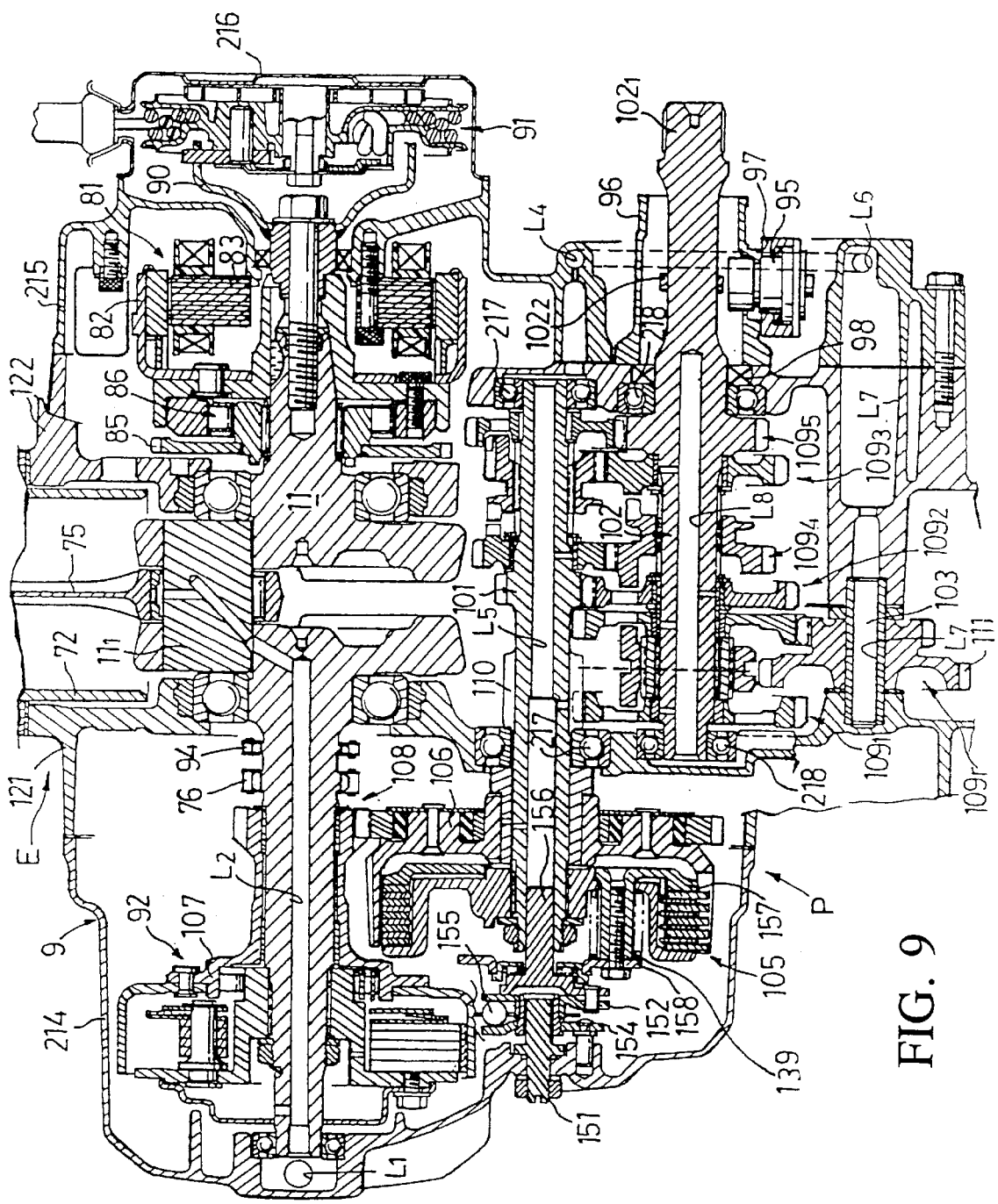
FIG. 9 is a sectional view taken along line 9—9 in FIG. 8.

As shown in FIGS. 8 to 10, the oil pump 93 is a well-known trochoid pump. An intake port 132 of the oil pump 93 faces the upper oil chamber 128 in the oil intake space 126, while a discharge port 133 thereof faces an oil discharge chamber 134. The oil discharge chamber 134 communicates with an oil path $L_2$ via an oil path $L_1$. The oil path $L_2$ opens to the front end of the crankshaft 11 to lubricate the starting clutch 92 disposed at the front end of the crankshaft 11 and also lubricate the outer periphery of a pin portion 111 of the crankshaft 11. An oil path $L_3$ branches from the oil path $L_1$ and is in communication with the cylinder head 73 via an oil path (not shown) to lubricate rocker arms 79$i$,79$o$ disposed therein.

An oil path $L_4$ extending from the discharge chamber 134 is in communication with the right end portion of an oil path $L_5$ formed in the interior of the main shaft 101 to lubricate the gears carried on the outer periphery of the main shaft 101 and also lubricate the speed change clutch 105 mounted on the left end of the main shaft 101. Further, an oil path $L_6$ branching from the oil path $L_4$ is in communication with an oil path $L_7$ formed in the interior of the reverse shaft 103 to lubricate the idler gear 111 carried on the outer periphery of the reverse shaft 103.

Figure 15:
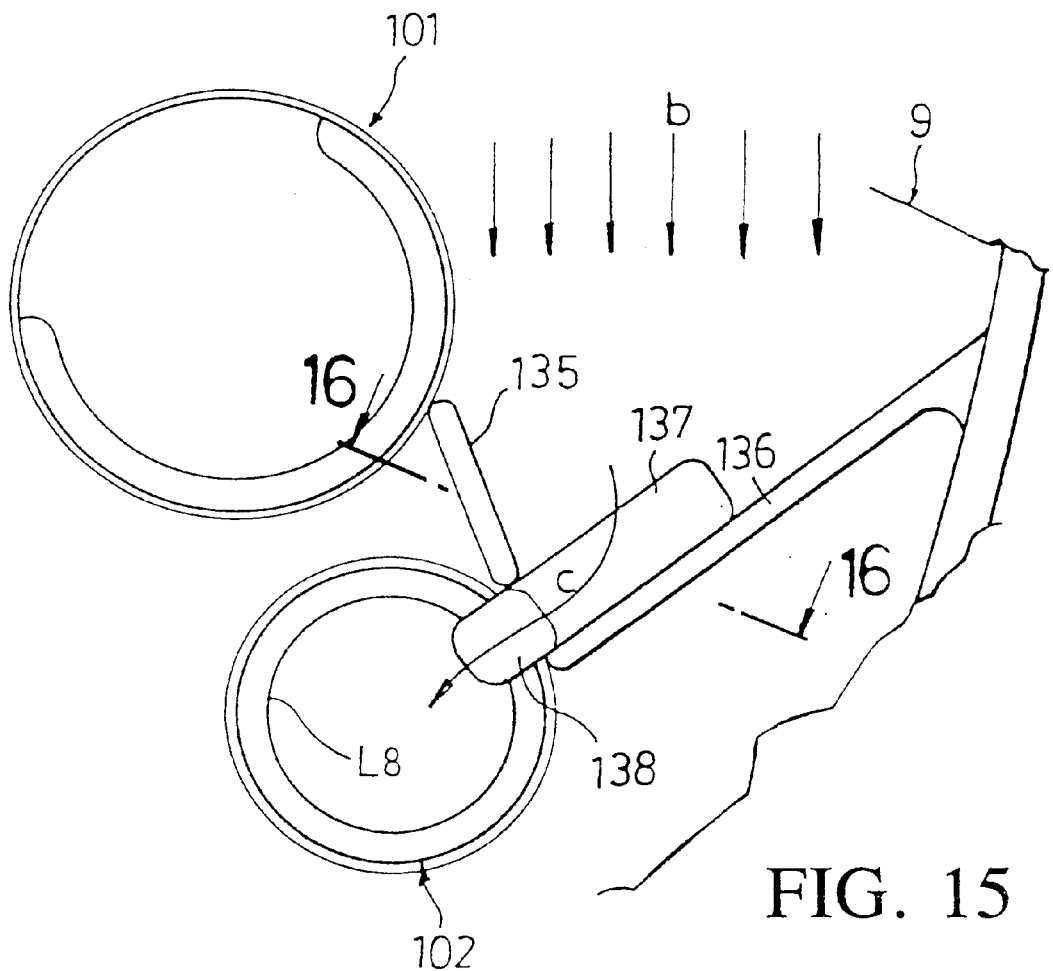
FIG. 15 is a view as seen in the direction of arrows 15—15 in FIG. 14.
Figure 16:
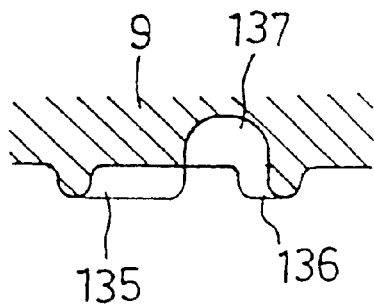
FIG. 16 is a sectional view taken along line 16—16 in FIG. 15.

As shown in FIG. 14, the oil leaking from the sliding surfaces of the reverse shaft 103 and the idler gear 111 flows downward (in the direction of arrow a in FIG. 14) along the inner wall of the casing 9 and enters an oil path $L_8$ formed in the interior of the counter shaft 102 to lubricate the gears carried on the outer periphery of the counter shaft 102. In this case, oil guide means are provided so that the oil flowing downward along the inner wall of the casing 9 may be guided into the oil path $L_8$ formed in the counter shaft 102. More specifically, as shown in FIGS. 14 to 16, a pair of guide ribs 135,136 project from the inner wall of the casing 9 below the reverse shaft 103 in a V-shape such that the spacing between the guide ribs 135,136 becomes narrower proceeding downward. Further, guide grooves 137,138 are formed between the guide ribs 135,136 and are in communication with an end portion of the oil path $L_8$ formed in the counter shaft 102. According to this construction, oil flowing down in the direction of the arrows b in FIG. 15 is gathered and conducted in the direction of arrow c, whereby an effective supply of oil to the oil path $L_8$ in the counter shaft 102 is ensured.

Next, the structure of the speed change mechanism of the transmission T will be described, with particular reference to FIGS. 17 to 21.

Figure 17:
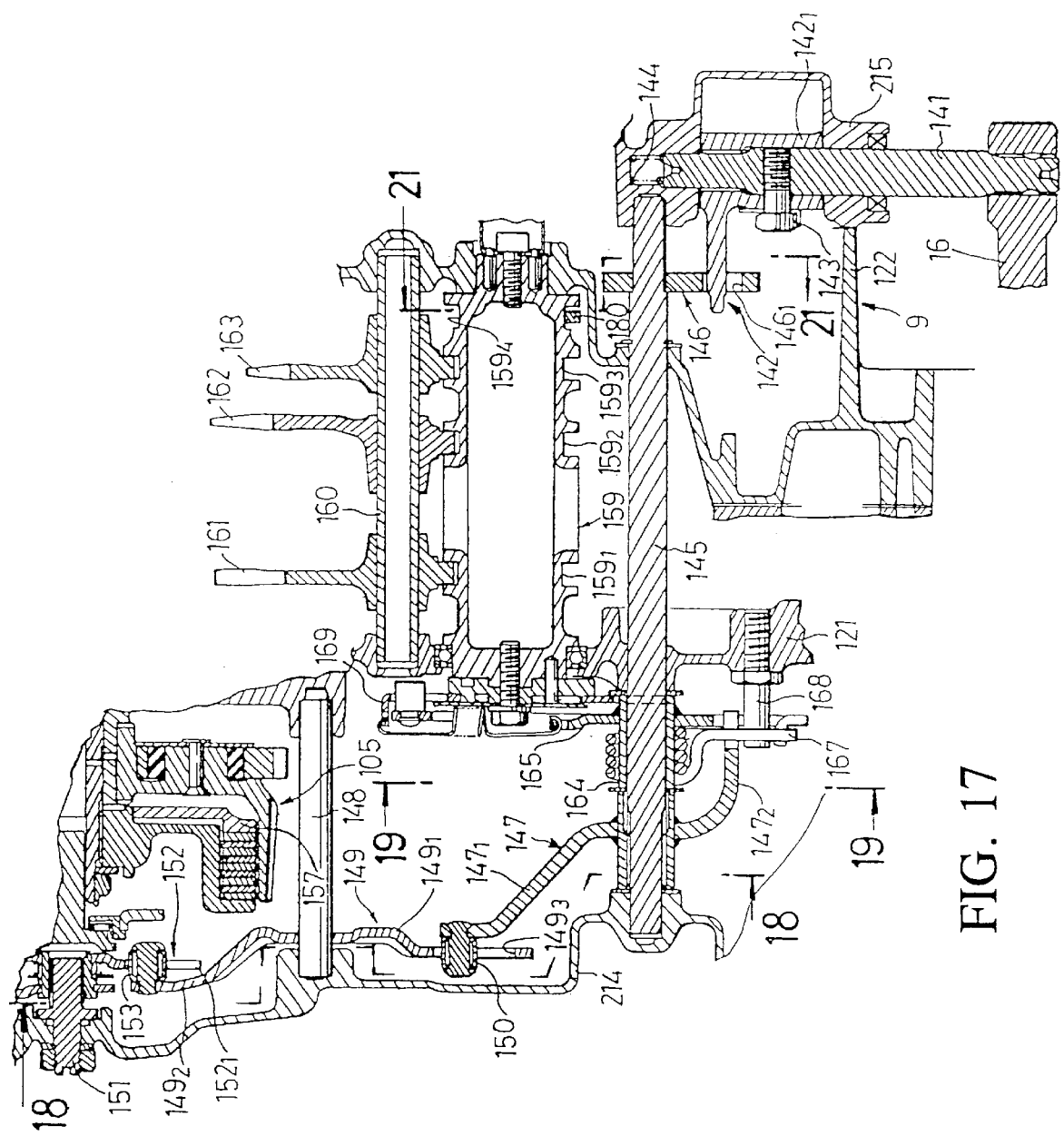
FIG. 17 is a sectional view taken along line 17—17 in FIG. 8.

As shown in FIG. 17, a change pedal shaft 141 is rotatably supported by the left side face of the rear cover 215 for the casing 9. The change pedal shaft 141 is connected to the rear end of the change pedal 16. A collar $142_1$ of a driving arm is fitted on the change pedal shaft 141 and fixed thereto by a bolt 143. The change pedal shaft 141 is biased outward of the casing 9 by a spring 144. With this biasing force, an end face of the collar $142_1$ is brought into abutment against the inner surface of the rear cover 215, thereby preventing the change pedal shaft 141 from wobbling or rattling.

Figure 21:
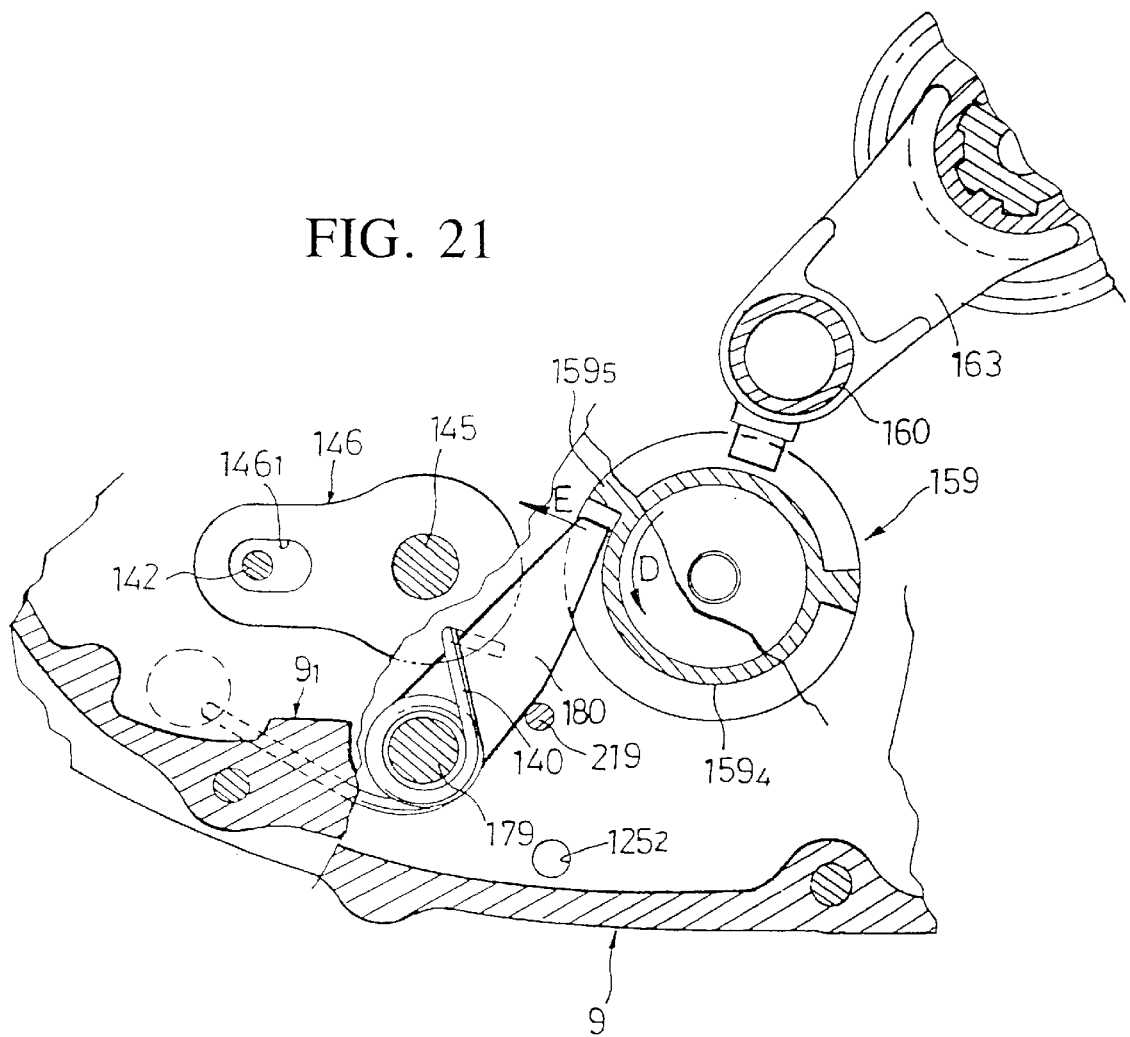
FIG. 21 is a sectional view taken along line 21—21 in FIG. 17.

As shown in FIGS. 17 and 21, a shift shaft 145 is rotatably supported by the casing 9, and extends longitudinally of the vehicle body. The front end of the driving arm 142 is engaged in an elongated hole $146_1$ in a driven arm 146 which is fixed to the rear portion of the shift shaft 145. Therefore, when the rider pushes the change pedal 16 up or down with his or her foot, the motion of the change pedal is transmitted to the shift shaft 145 via the change pedal shaft 141, the driving arm 142, and the driven arm 146 to rotate the shift shaft 145. In order to avoid transfer of an excessive torque to the shift shaft 145 when the change pedal 16 is depressed by the rider's foot, a stopper $9_1$ (see FIG. 21) is formed on the inner surface of the casing 9, which abuts against the front end of the driven arm 146.

Figure 18:
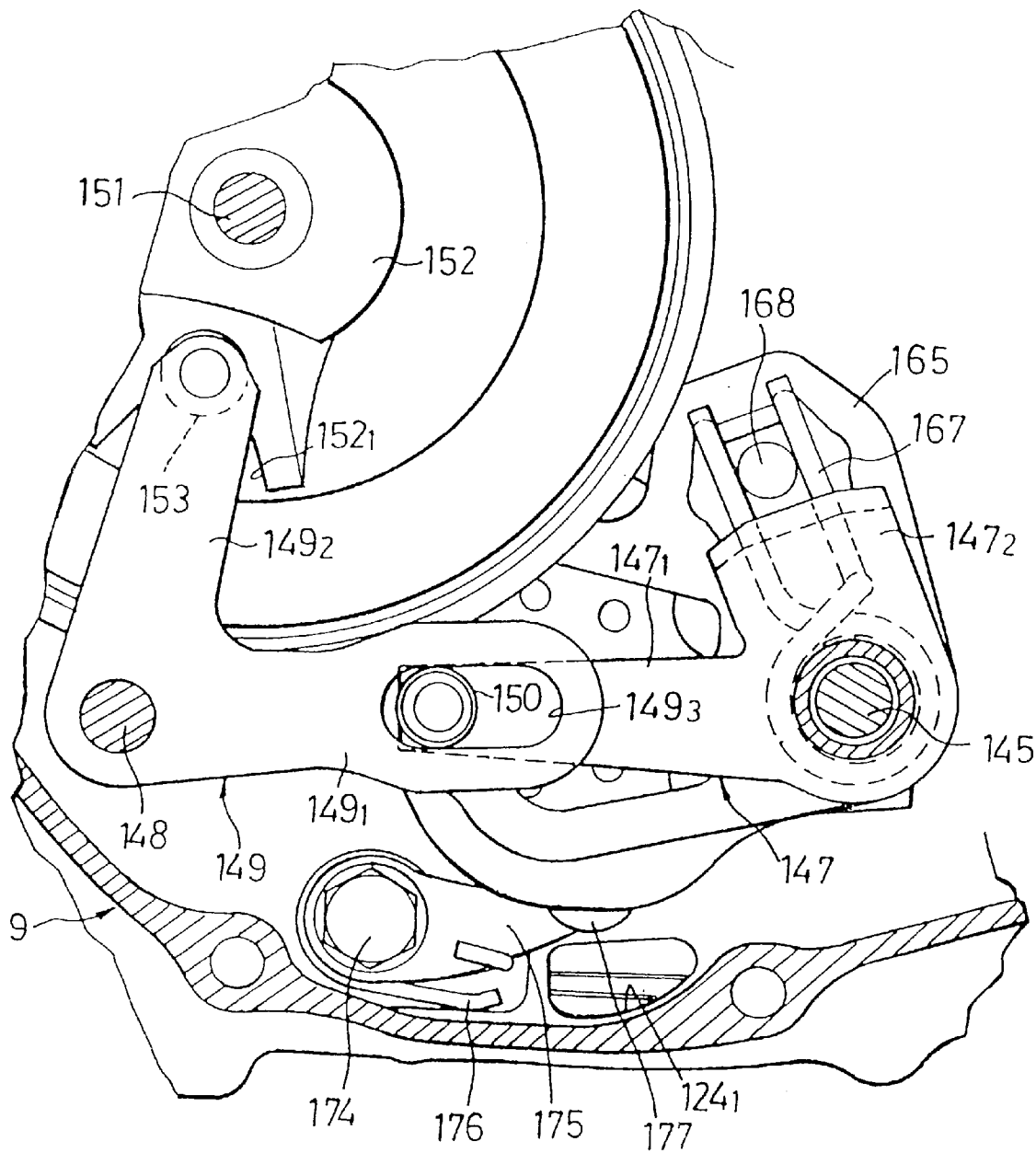
FIG. 18 is a sectional view taken along line 18—18 in FIG. 17.

As shown in FIGS. 17 and 18, an L-shaped first arm member 147 is splined to the front end of the shift shaft 145. A support shaft 148 extending longitudinally of the vehicle body is rotatably supported by the casing 9. An L-shaped second arm member 149 is fixed onto the support shaft 148. A roller 150 is provided at the front end of a first arm portion $147_1$ of the first arm member 147. The roller 150 engages an elongated hole $149_3$ formed in the front end of a first arm portion $149_1$ of the second arm member 149. A support shaft 151 is fixed to the casing 9, and is opposed to an end portion of the main shaft 101. A movable cam plate 152 is rotatably supported on the support shaft 151. A roller 153 is provided at the front end of a second arm portion $149_2$ of the second arm member 149 and is engaged with a notch $152_1$ of the movable cam plate 152.

As shown in FIG. 9 in combination with the above figures, a stationary cam plate 154 is supported on the support shaft 151 in opposition to the movable cam plate 152. A ball 155 is located between the stationary cam plate 154 and the movable cam plate 152. A sliding shaft 156 is slidably fitted in the end portion of the main shaft 101 and is coupled with the movable cam plate 152. Further, the movable cam plate 152 and a clutch piston 157 of the speed change clutch 105 are interconnected through a connection plate 158.

When the change pedal shaft 141 is rotated clockwise or counterclockwise by operation of the change pedal 16, the movable cam plate 152 is rotated through the first arm member 147 and the second arm member 149. Under a reaction force exerted on the movable cam plate 152 from the stationary cam plate 154 and the ball 155, the movable cam plate 152 slides in a direction approaching the main shaft 101 together with the sliding shaft 156 against the biasing force of a clutch spring 139. As a result, the clutch piston 157 connected to the movable cam plate 152 moves rightwardly as viewed in FIG. 9 toward the rear side of the vehicle body to release the speed change clutch 105.

As shown in FIG. 17, a shift drum 159 and a shift fork shaft 160 are supported longitudinally of the vehicle body within the casing 9. Three cam grooves $159_1,159_2,159_3$ are formed in the outer periphery of the shift drum 159. Also, three shift forks 161,162,163 are slidably supported on the shift fork shaft 160, and are engaged with the cam grooves $159_1,159_2,159_3$, respectively.

Figure 19:
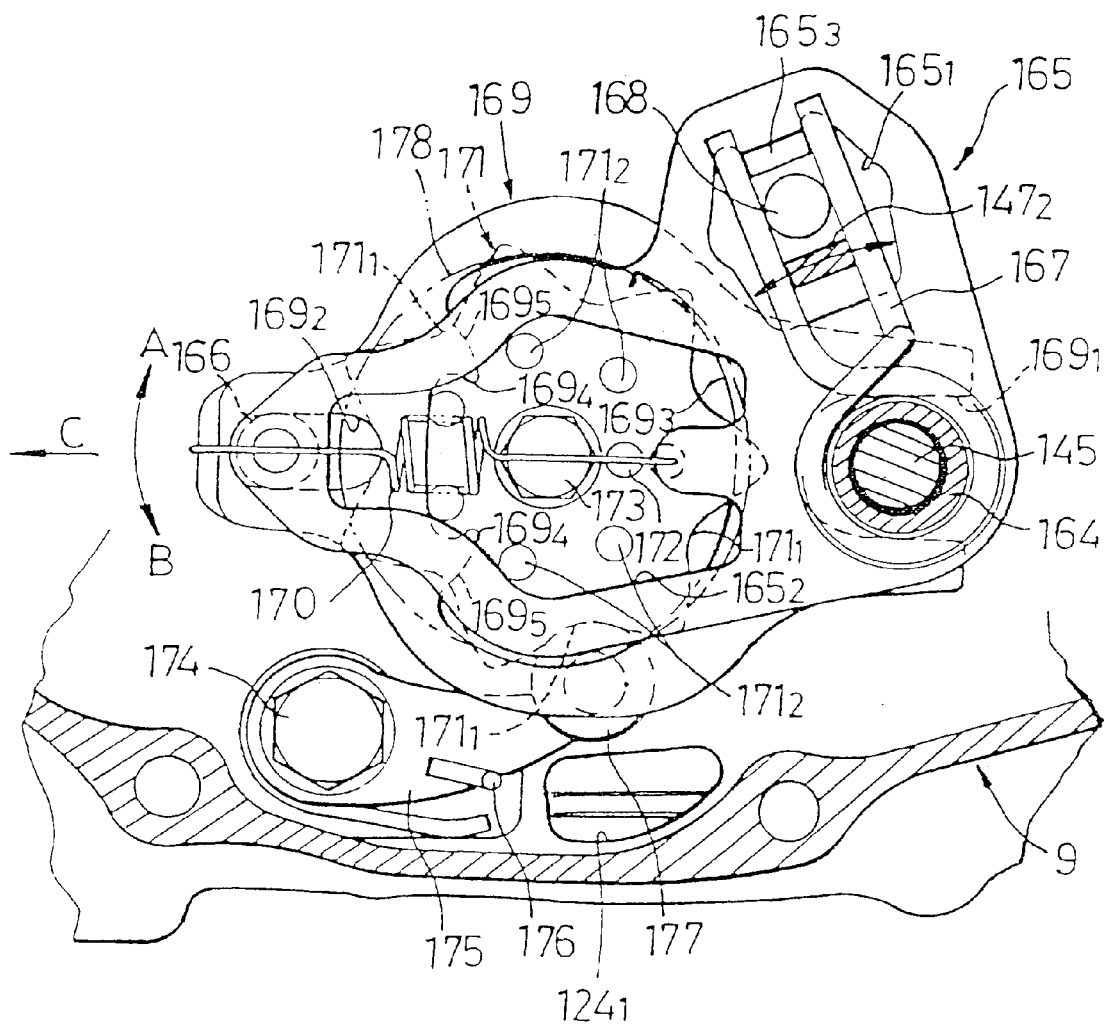
FIG. 19 is a sectional view taken along line 19—19 in FIG. 17.
Figure 20:
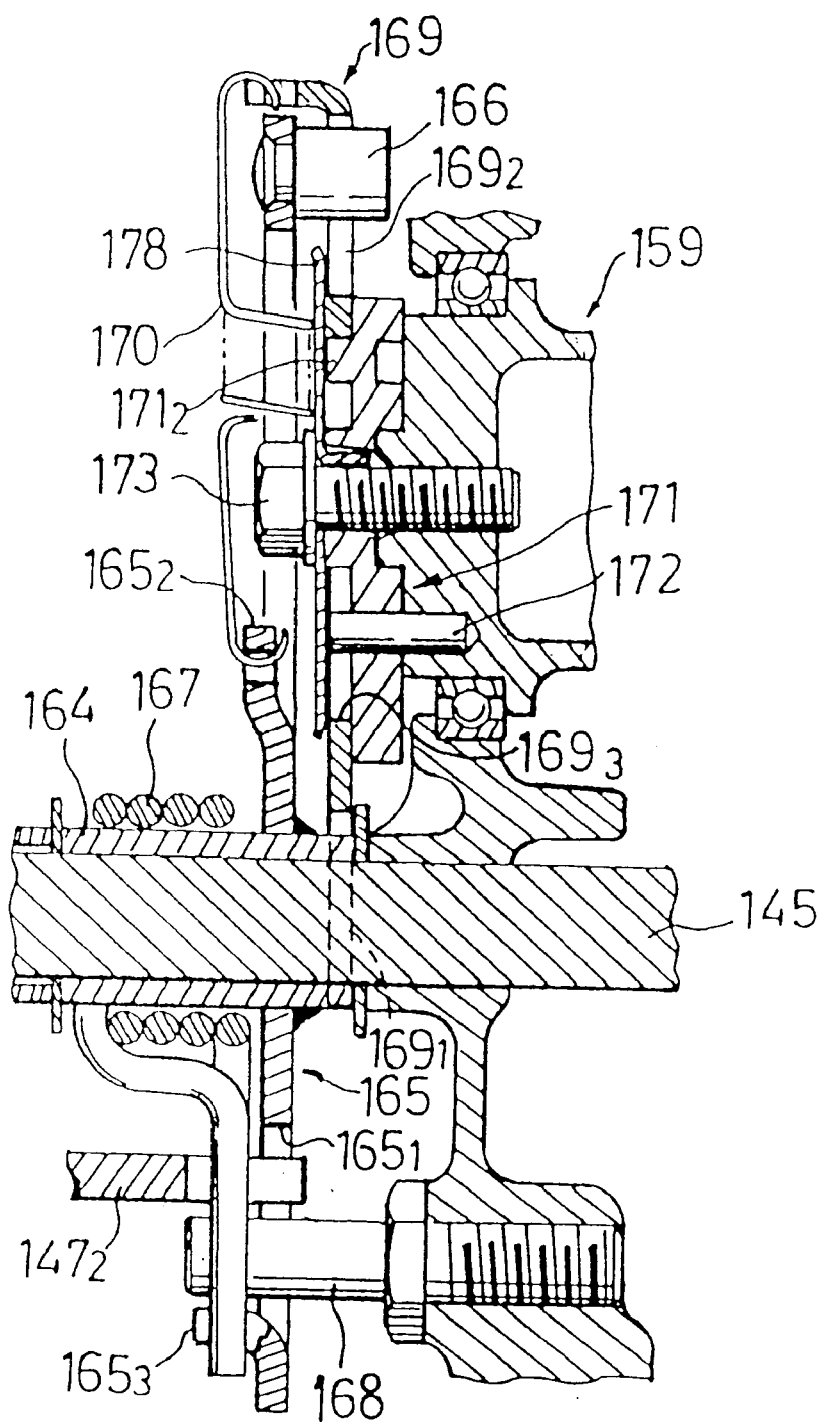
FIG. 20 is an enlarged sectional view of a principal portion of FIG. 17.

As shown in FIGS. 19 and 20, a collar 164 is fitted on the outer periphery of the shift shaft 145 in a relatively rotatable manner. A base end of a change arm 165 is welded to the collar 164. The change arm 165 is provided with a first opening $165_1$, a second opening $165_2$, a spring shoe $165_3$ formed by folding the inner peripheral edge of the first opening $165_1$, and a roller 166. Both ends of a torsion coil spring 167 supported on the collar 164 are abutted against both side portions of a stud bolt 168. The stud bolt 168 is threaded into the casing 9 and extends loosely through the first opening $165_1$. The ends of the torsion coil spring 167 are also abutted against both side portions of the spring bracket $165_3$ of the change arm 165. Accordingly, if the change arm 165 located at the central neutral position is swung in any direction up to the position where the edge of the first opening $165_1$ is brought into contact with the stud bolt 168, then the spring bracket $165_3$ distorts the torsion coil spring 167 to generate a positioning force for restoring the change arm 165 to the above-mentioned central position.

The tip of a second arm portion $147_2$ of the first arm member 147 extends into the first opening $165_1$ of the change arm 165, and is inserted between both ends of the torsion coil spring 167. Therefore, when the first arm 147 fixed to the shift shaft 145 rotates in either direction, the tip of the second arm portion $147_2$ of the first arm member 147 moves by a predetermined distance through the first opening $165_1$ of the change arm 165. When the tip of the second arm portion $127_2$ is brought into contact with the inside edge of the first opening $165_1$, the change arm 165 is rotated in the clockwise or counterclockwise direction. While the second arm $147_2$ of the first arm member 147 is idly moved, the change arm 165 remains at the neutral position in a stopped state, and the engagement of the speed changing clutch 105 is released during the stopped state. Accordingly, the speed change operation is started consistently with a predetermined time lag from the release of the engagement with the speed changing clutch 105.

A change plate 169 is disposed between an end face of the shift drum 159 and the change arm 165. The change plate 169 includes a cutout portion $169_1$ formed at one end thereof, an elongated hole $169_2$ formed at the opposite end, and an opening $169_3$ formed centrally therein. With the cutout portion $169_1$ engaged with the outer periphery of the collar 164 and the elongated hole $169_2$ engaged with the roller 166 of the change arm 165, the change plate 169 is urged in a direction along the cutout portion $169_1$ and the elongated hole $169_2$ by a spring 170 stretched between the change plate 169 and the change arm 165. In this state, the second opening $165_2$ of the change arm 165 and the opening $169_3$ of the change plate 169 are disposed in positions substantially overlapping each other.

A star-shaped pin plate 171 is fixed to an end portion of the shift drum 159 with a bolt 173 through a positioning pin 172. A detent arm 175 is pivotally secured by a pivot shaft 174 to the casing 9, and is biased by a spring 176. A detent roller 177 is provided at the front end of the detent arm 175. The detent roller 177 comes into resilient engagement with any of seven recesses $171_1$ formed in the outer periphery of the pin plate 171. Accordingly, the shift drum 159 can stop at any of seven rotational positions corresponding to seven shift positions.

Seven sprocket pins $171_2$ are circumferentially arranged on an end face of the pin plate 171. A pair of projections $169_4,169_4$ and a pair of cam surfaces $169_5,169_5$ engageable with the sprocket pins $171_2$ are formed on the inner periphery of the opening $169_3$ in the change plate 169. A plate-like holder 178 presses against the outer surface of the change plate 169 and is secured thereto by the bolt 173 in order to prevent the change plate 169 from coming off the pin plate 171.

A reverse shift restricting mechanism is provided to prevent the transmission form shifting into the reverse gear shift during forward motion of the vehicle. As shown in FIGS. 10, 11 and 21, a reverse shift restricting arm 180 is rotatably supported by the casing 9 through a support shaft 179. The front end of the reverse shift restricting arm 180 is biased toward the shift drum 159 by a spring 140. A guide groove $159_4$ is formed in the outer periphery of the rear portion of the shift drum 159. A stopper $159_5$ projects from the interior of the guide groove $159_4$. The front end of the reverse shift restricting arm 180 can abut against the stopper $159_5$.

As shown in FIG. 21, clockwise rotation of the reverse shift control arm 180 is restricted by a stopper 219 so that the tip of the reverse shift control arm 180 does not press against the guide groove $159_4$. This is advantageous in that the sliding resistance during rotation of the shift drum 159 can be decreased and hence the shift load can be diminished.

When the reverse gear is selected by rotating the shift drum 159 in the direction of arrow D in FIG. 12, the front end of the reverse shift restricting arm 180 abuts the stopper $159_5$ in the guide groove $159_4$ to restrict the rotation of the shift drum 159. When the reverse shift lever 5 (see FIGS. 1 and 2) attached to the handle 1 is operated, a support shaft 179 which is connected to the lever 5 through a wire (not shown) rotates and the front end of the reverse shift restricting arm 180 rotates in the direction of arrow E away from the stopper $159_5$. As a result, rotation of the shift drum 159 in the direction of arrow D is permitted, thus permitting the reverse gear to be established. In this way, it is possible to prevent accidental selection of the reverse gear by permitting the reverse gear to be engaged only when the reverse shift lever 5 is operated.

Figure 23:
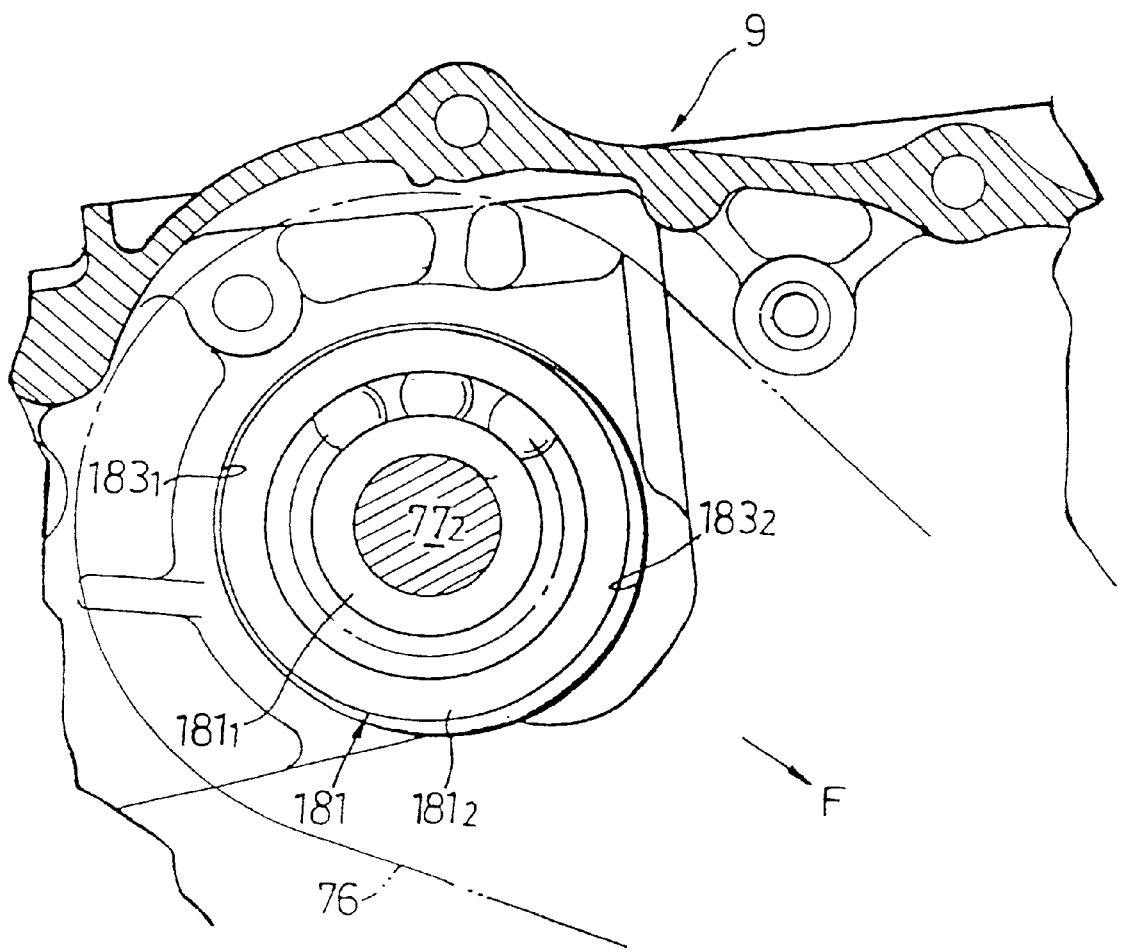
FIG. 23 is a sectional view taken along line 23—23 in FIG. 22.
Figure 24:
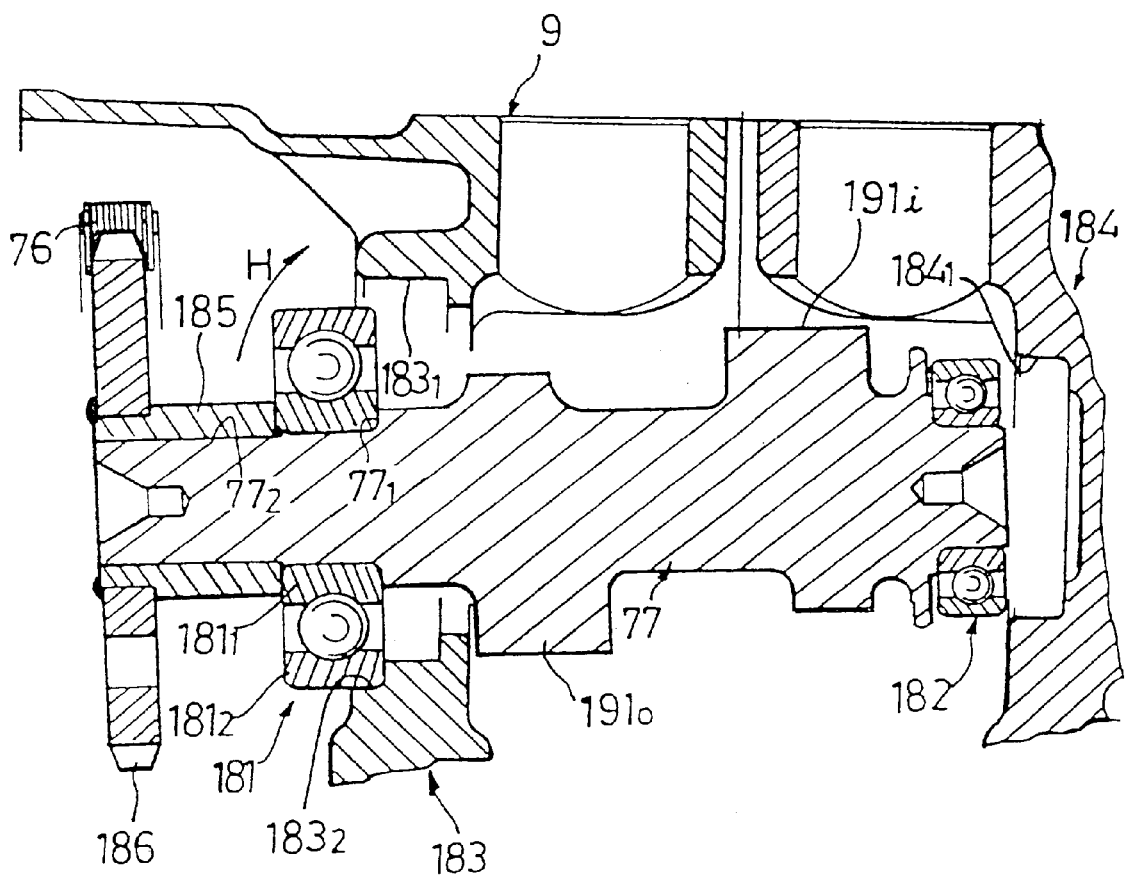
FIG. 24 is a sectional diagrammatic view corresponding to FIG. 22 for explaining the operation of the elements.

The structure of a valve operation mechanism will now be described, with particular reference to FIGS. 22 to 24.

The camshaft 77 is supported at its front and rear end portions by support walls 183 and 184 of the casing 9 through ball bearings 181 and 182, respectively. The front end portion of the camshaft 77 has a reduced-diameter portion $77_2$ formed as a stepped portion $77_1$ on the camshaft 77. An inner race $181_1$ of the ball bearing 181 is fitted on the reduced diameter portion $77_2$, and a collar 185 is press-fitted onto the front end of the camshaft 77. A sprocket 186 is welded onto the collar 185, and the sprocket 186 is connected to the crankshaft 11 through the silent chain 76.

Support holes $183_1,184_1$ having a circular cross-section are formed in the support walls 183,184, respectively, to support both ball bearings 181,182. The support hole $183_1$ closer to the sprocket 186 is cut out in a crescent shape at its end face located on the sprocket 186 side to form a stepped portion $183_2$. The direction of the stepped portion $183_2$ as seen from the center of the camshaft 77 is coincident with the extending direction of the silent chain 76, namely the direction of arrow F in FIG. 23. An outer race $181_2$ of the ball bearing 181 is fitted on the stepped portion $183_2$ of the support wall 183.

When the camshaft 77 is to be mounted to the casing 9, the paired ball bearings 181,182, the collar 185 and the sprocket 186 are mounted beforehand to the camshaft 77. Then, as shown in FIG. 24, the outer race $181_2$ of the ball bearing 181 on the sprocket 186 side is brought into engagement with the stepped portion $183_2$ of the support hole $183_1$ formed in the support wall 183 and is held there temporarily. Then, the ball bearing 182 located on the side opposite to the sprocket 186 side is disengaged from the support hole $184_1$ formed in the support wall 184, allowing the camshaft 77 to be inclined with respect to the crankshaft 11, to decrease the distance between the sprocket ends of the respective shafts. This allows the silent chain 76 to be entrained on the sprocket 186 in an untensioned state. Thereafter, the ball bearing 181 located on the sprocket 186 side is moved in the direction of arrow H in FIG. 24 to disengage its outer race $181_2$ from the stepped portion $183_2$ and bring it into exact engagement with the support hole $183_1$. At the same time, the ball bearing 182 located on the side opposite to the sprocket 186 side is brought into exact engagement with the support hole $184_1$ formed in the support wall 184. Thus, assembling of the camshaft 77 in the casing 9 is completed.

According to the above construction, even if the ball bearings 181,182, the collar 185 and the sprocket 186 are preassembled onto the camshaft 77 to produce a subassembly, it is possible to easily install the camshaft 77. Thus, it is possible to reduce the number of components and the number of mounting steps.

If the camshaft 77 is assembled as described above without providing the step $183_2$, the camshaft 77 moves excessively in the axial direction when assembled, and the excessive movement causes a twist between the sprocket 186 and silent chain 76. If the wall thickness of the supporting wall 183 is reduced to avoid the twist, the reduced wall thickness reduces the supporting rigidity of the camshaft 77.

Figure 22:
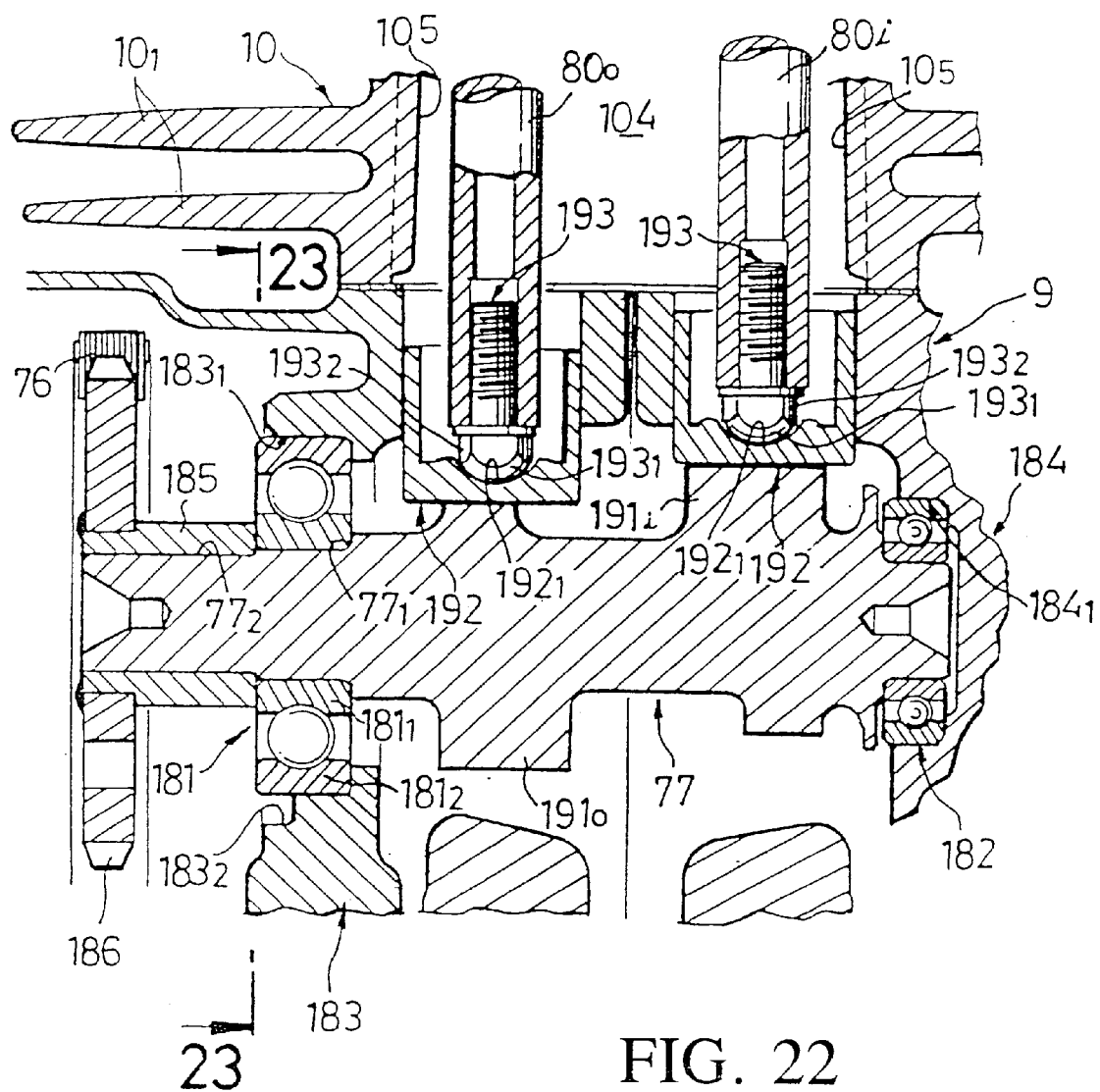
FIG. 22 is an enlarged sectional view of a principal portion of FIG. 10.

As shown in FIG. 22, an intake cam 191$i$ and an exhaust cam 191$o$ are formed integrally on the camshaft 77. A pair of valve lifters 192,192 are slidably supported by the casing 9, and are in abutment with the intake cam 191$i$ and exhaust cam 191$o$. Iron or steel bolts 193,193 are threaded into the lower ends of the aluminum push rods 80$i$ and 80$o$. Each bolt 193 has a spherical portion $193_1$ formed on the head, and a hexagonal chamfered portion $193_2$ contiguous with the spherical portion $193_1$. The upper surface of each valve lifter 192 is formed with a spherical recess $192_1$ for receiving the spherical portion $193_1$ of the bolt 193 therein. Further, two ribs $10_5, 10_5$ are formed in the cylinder block 10 which face the push rod receiving space $10_4$. The lower ends of the ribs $10_5, 10_5$ project outwardly for abutment against the upper ends of the valve lifters 192,192.

When the push rods 80$i$ and 80$o$ are pulled upwardly and removed for maintenance, even if the valve lifters 192,192 remain affixed to the push rods by virtue of the viscosity of oil, upward movement of the valve lifters 192,192 is inhibited by the ribs $10_5, 10_5$. Thus, the valve lifters 192,192 are forcibly separated from the push rods. In this way, the valve lifters 192,192 are prevented from becoming disengaged from their mounted positions, and it is possible to save time and labor which would be required to remount them.

Because the spherical portions $193_1, 193_1$ of the push rods 80$i$,80$o$ are formed by the bolts 193,193, it is possible to reduce the overall weight, as compared with a case where the push rods 80$i$,80$o$ and the spherical portions are entirely formed of iron. Additionally, since the bolts 193,193 are each provided with the hexagonal chamfered portion $193_2$ engagable by a tool, the spherical portions $193_1, 193_1$ can be easily fitted in the body portions of the push rods 80$i$,80$o$.

Next, the structure of a chain tensioner for the silent chain 76 which drives the camshaft 77 will be described below with reference to FIGS. 25 and 26.

Figure 25:
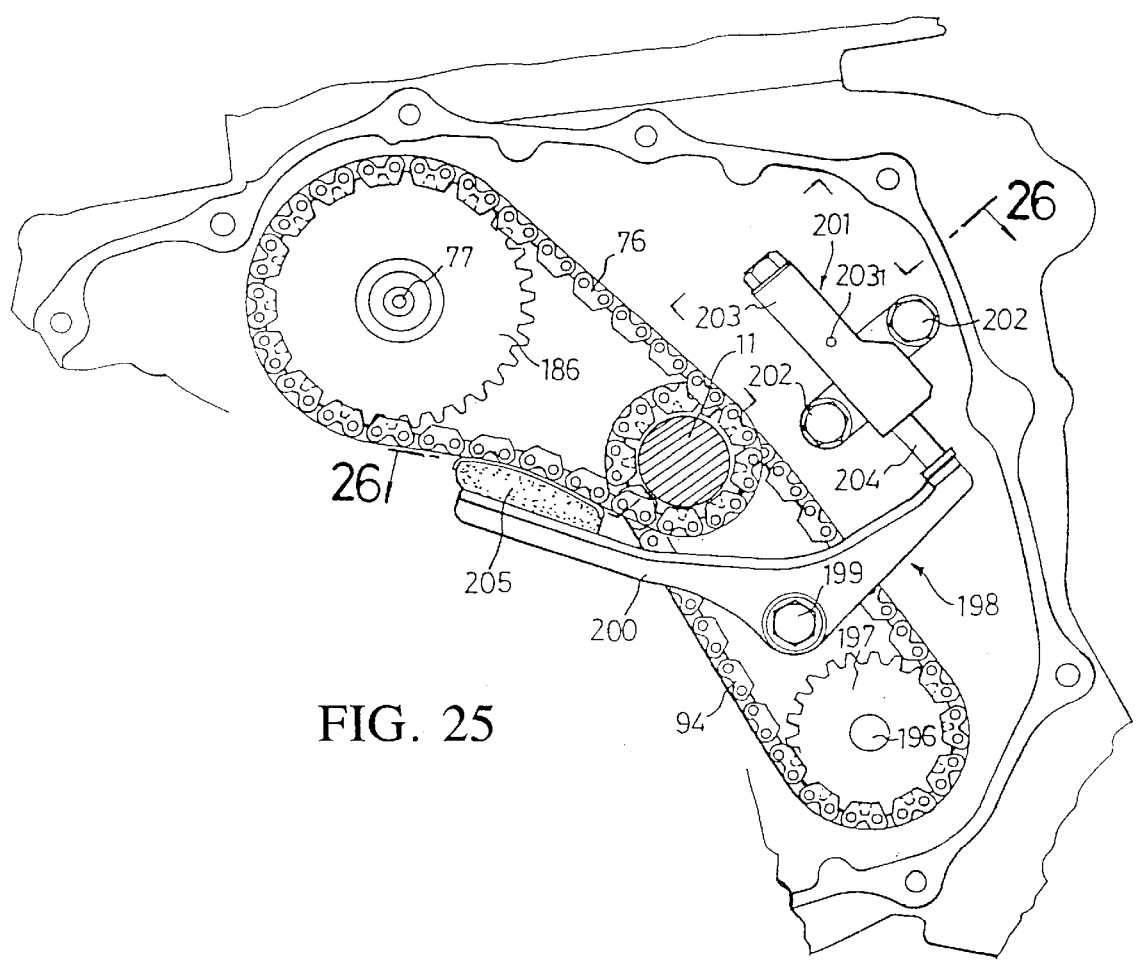
FIG. 25 is a sectional view taken along line 25—25 in FIG. 10.

As shown in FIG. 25, a sprocket 194 mounted on the crankshaft 11 and the sprocket 186 mounted on the camshaft 77 are interconnected through the silent chain 76. A sprocket 195 mounted on the crankshaft 11 and a sprocket 197 mounted on an oil pump shaft 196 are also interconnected through a silent chain 94.

Figure 26:
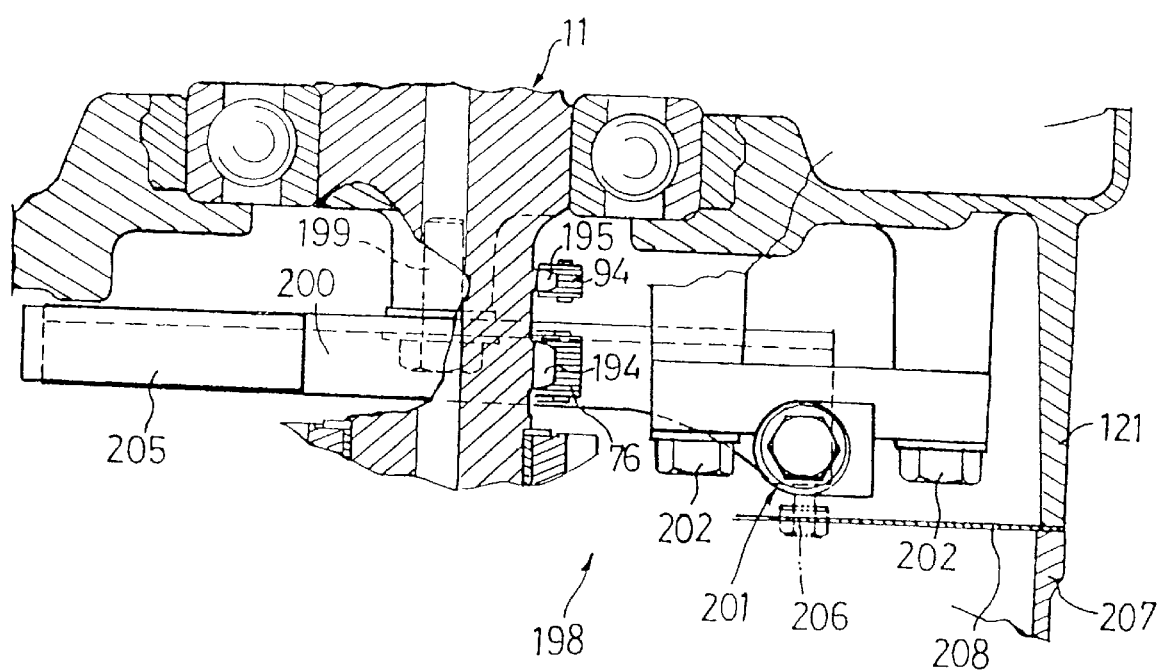
FIG. 26 is a sectional view taken along line 26—26 in FIG. 25.

As shown in FIG. 26 in combination with the above figures, a chain tensioner 198 is utilized for imparting a predetermined tension to the silent chain 76 which drives the camshaft 77. The chain tensioner 198 is provided with an L-shaped arm 200 whose central part is pivotally supported by a pivot shaft 199. A biasing means 201 urges the arm 200 in a clockwise direction as viewed in FIG. 25. The biasing means 201 is provided with a piston rod 204 which is biased in a direction projecting from a cylinder 203 by a spring (not shown). The cylinder 203 is fixed to the casing 9 by bolts 202,202. One end of the arm 200 is pressed by the front end of the piston rod 204, causing a shoe 205 provided at the opposite end of the arm 200 to contact and press against the silent chain 76.

In order to install the biasing means 201, a temporary bolt 206 is threaded into a bolt hole $203_1$ formed in the cylinder 203 to lock the piston rod 204 in its retracted position. After installation of the biasing means 201 is complete, the bolt 206 is removed and the piston rod 204 is allowed to project to impart a predetermined tension in the silent chain 76. As shown in FIG. 26, the bolt 206 is positioned in the same plane as a gasket 208 which is held between adjoining surfaces of casings 121 and 207. Therefore, if an attempt is made to couple the casings 121,207 together without removing the bolt 206, the gasket 208 interferes with the bolt 206, and thus it is impossible to couple the casings 121,207 together without removing the bolt 206.

The operation of this embodiment will now be described. During idling of the engine E, the number of revolutions of the crankshaft 11 is low and the centrifugal starting clutch 92 remains in a disengaged state, so that the crankshaft 11 does not transfer power to the speed change clutch 105.

When the first (low) gear train $109_1$ of the transmission T is established and the output of the engine E is increased for starting the vehicle, the starting clutch 92 is engaged automatically as the number of revolutions of the crankshaft 11 increases. The rotation of the crankshaft 11 is then transmitted to the main shaft 101 via the starting clutch 72, reduction gears 108 and speed change clutch 105, and further transmitted from the first gear train $109_1$ to the counter shaft 102. As a result, the rotation of the counter shaft 102 is transmitted to the rear wheels Wr,Wr via the propeller shaft 52, pinion gear 57, ring gear 58 and rear axles 55,55 to initiate movement of the vehicle.

While the vehicle is running, the speed change gears $109_1$ to $109_5$ and $109_r$ are shifted in the following manner. When the change arm 165 turns, for example, in the direction of arrow A in FIG. 19 by operation of the change pedal 16, the change plate 169, which is engaged with the change arm 165 through the roller 166 and the elongated hole $169_1$, turns in the direction of arrow A and the lower projection $169_4$ formed in the opening $169_3$ of the change plate 169 pushes one feed pin $171_2$ upward, allowing the shift drum 159 to turn by one pitch in the direction of arrow A. As a result, the detent roller 177 comes into engagement with a new recess 171 of the pin plate 171, whereby the shift drum 159 is stopped at a new position.

Upon release of the change pedal 16, the change arm 165 turns in the direction of arrow B toward its neutral position under the biasing force of the torsion coil spring 167. At this time, the change plate 169 also turns in the direction of arrow B together with the change arm 165. However, because the lower cam surface $169_5$ formed in the opening $169_3$ of the change plate 169 comes into abutment against one feed pin $171_2$ and undergoes a reaction force, this reaction force causes the change plate 169 to move in the direction of arrow C in FIG. 19 while expanding the spring 170. Consequently, the cam surface $169_5$ moves over the pin $171_2$, so that the change arm 165 and the change plate 169 can return to their neutral positions while leaving the shift drum 156 stopped in the new position.

When the change arm 165 is turned, for example, in the direction of arrow B by operation of the change pedal 16, the shift drum 159 turns by only one pitch in the direction of arrow B, and stops at a new position in the same manner as above. As the shift drum 159 thus turns pitch-by-pitch, the three shift forks 161,162,163 which are engaged in the cam grooves $159_1, 159_2, 159_3$ of the shift drum slide axially in FIG. 17 to establish a predetermined gear shift position in the transmission T.

Next, additional components of the engine E will be described below with particular reference to FIGS. 27 to 30.

Figure 27:
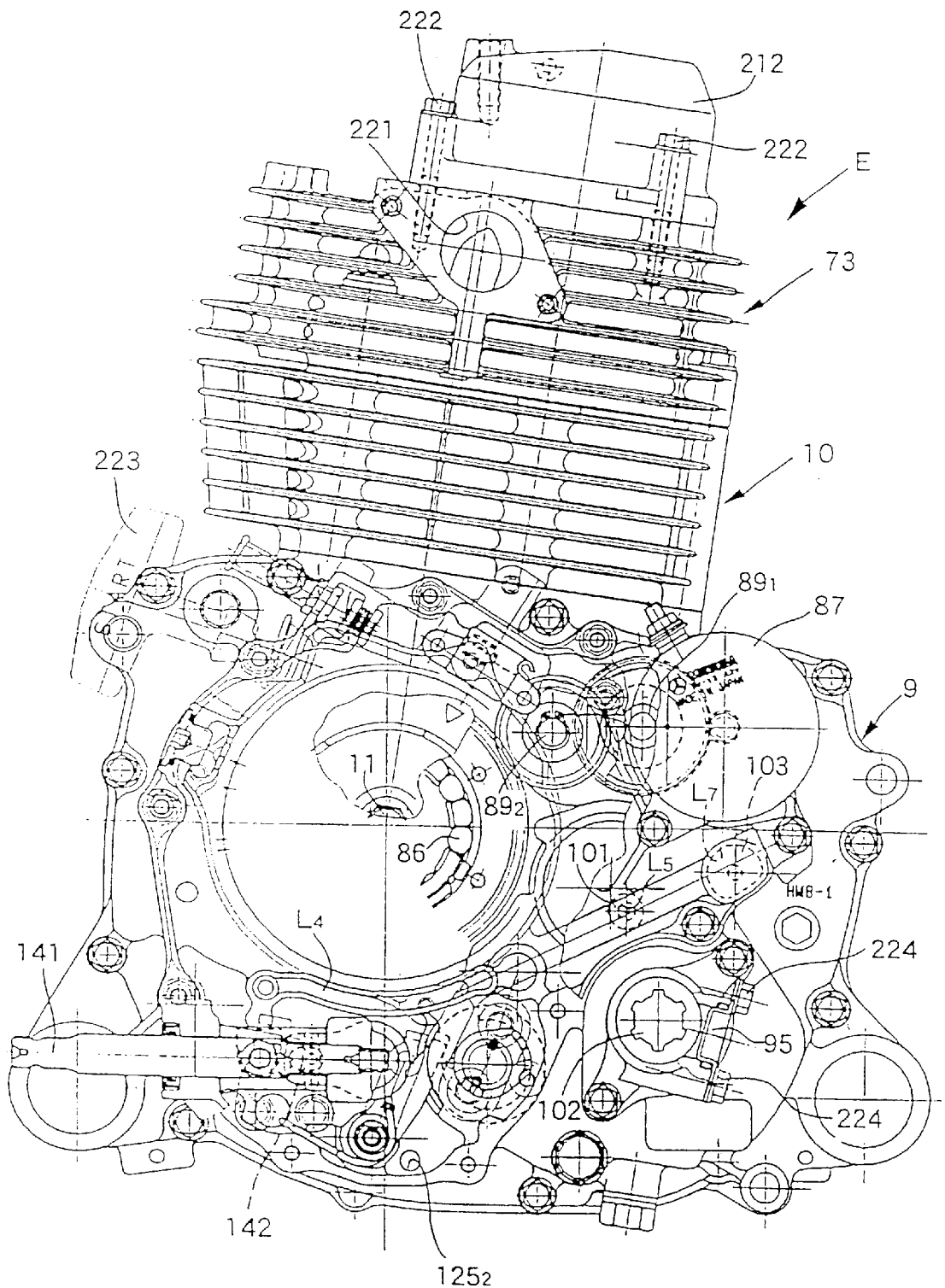
FIG. 27 is an enlarged view taken along line 27—27 in FIG. 5.
Figure 28:
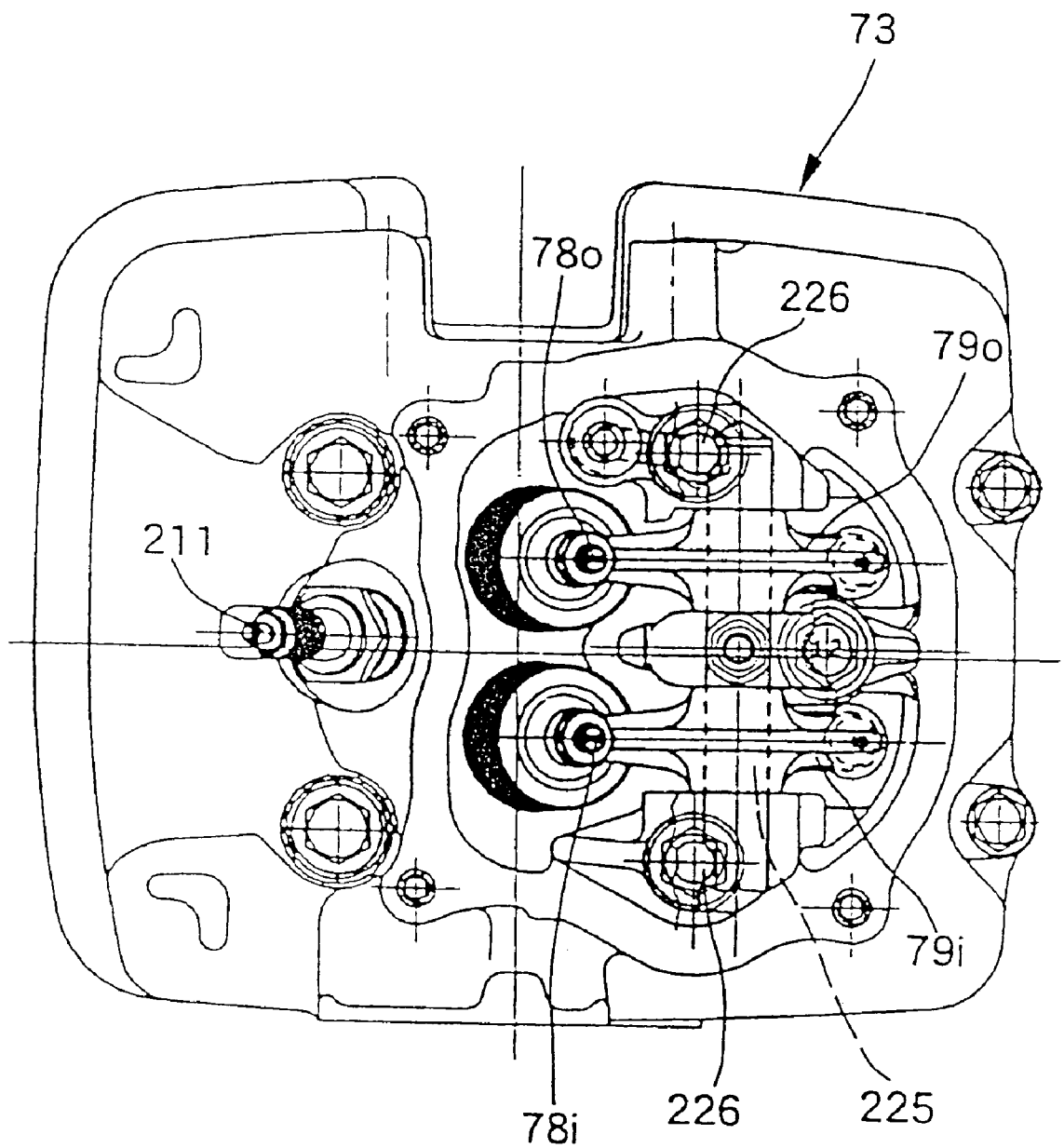
FIG. 28 is a plan view of the upper portion of FIG. 27 with the valve cover removed.
Figure 29:
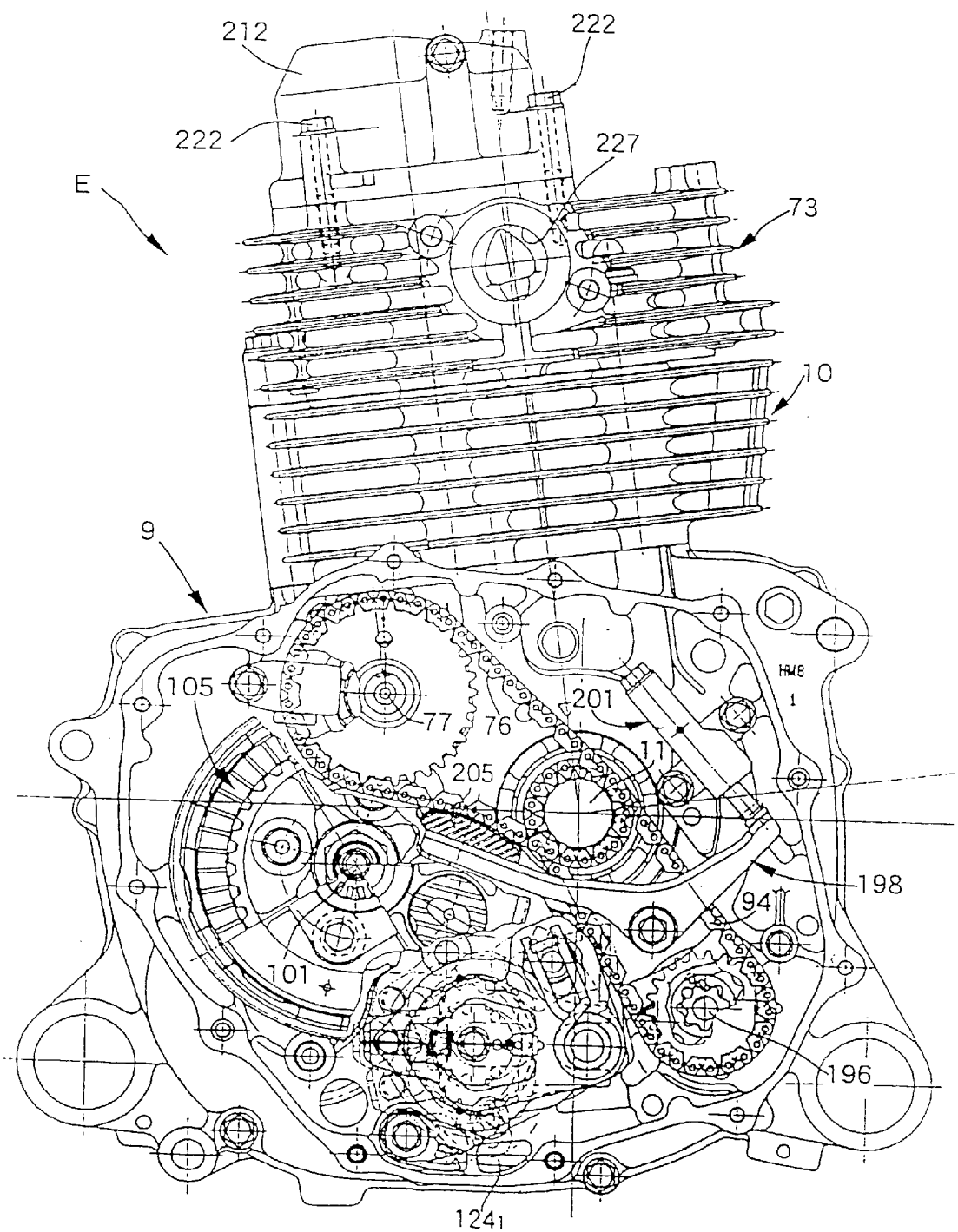
FIG. 29 is an enlarged view taken along line 29—29 in FIG. 5.
Figure 30:
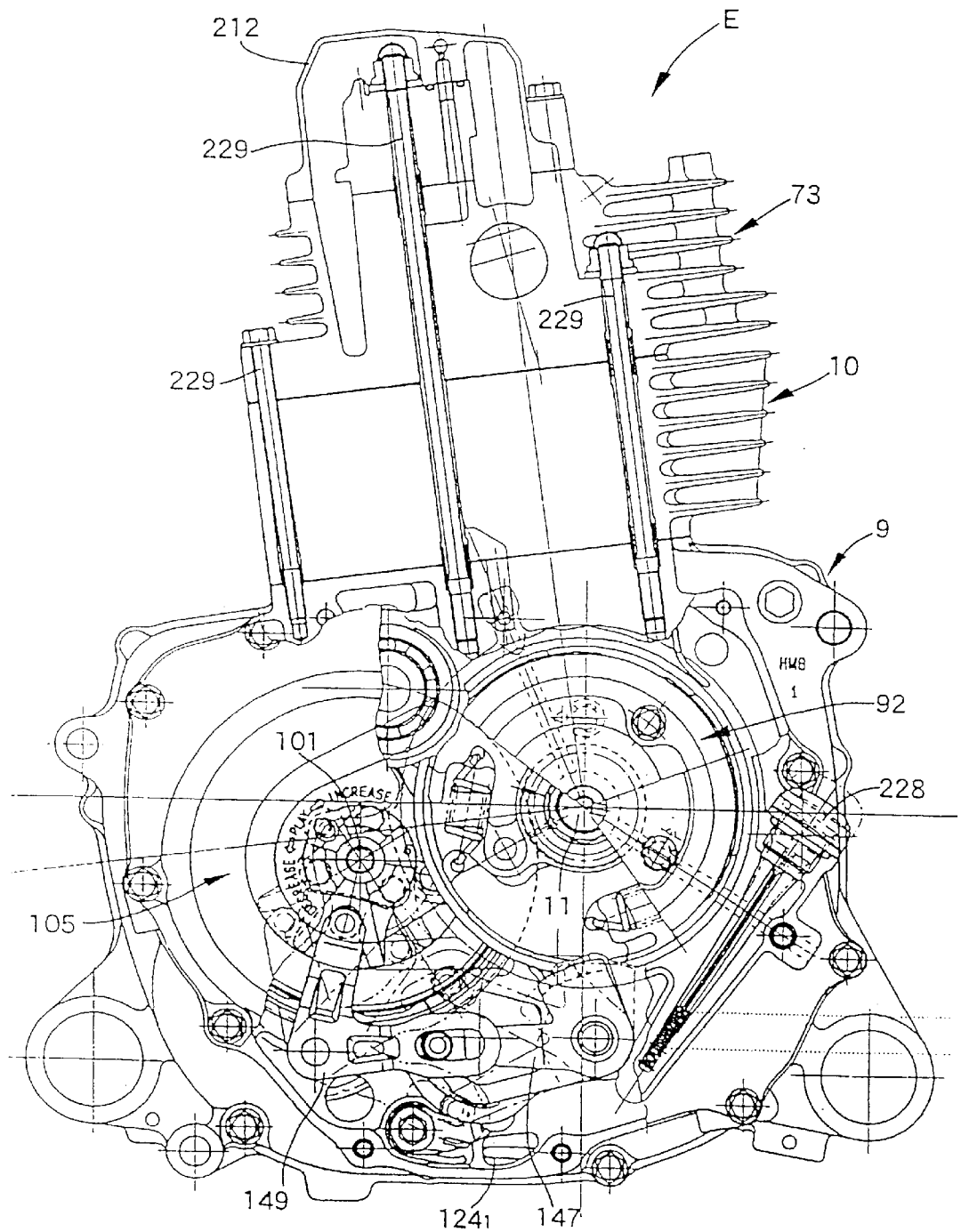
FIG. 30 is an enlarged view taken along line 30—30 in FIG. 5.

As shown in FIG. 27, an intake port 211 is provided in a cylinder head 73 of an engine E. Bolts 222 are used to attach a head cover 212 to the cylinder head 73. A pull knob 223 of the recoil starter is shown, and a bolt 224 is used to attach the vehicle speed sensor 95. In FIG. 28, a rocker arm shaft 225 is attached by a plurality of rocker arm shaft fixing bolts 226. As shown in FIG. 29, an exhaust port 227 is provided in a cylinder head 73 of an engine E. In FIG. 30, an oil level gauge 228 is shown, as well as bolts 229 for fixing the cylinder head 10 to the casing 9.

Figure 31:
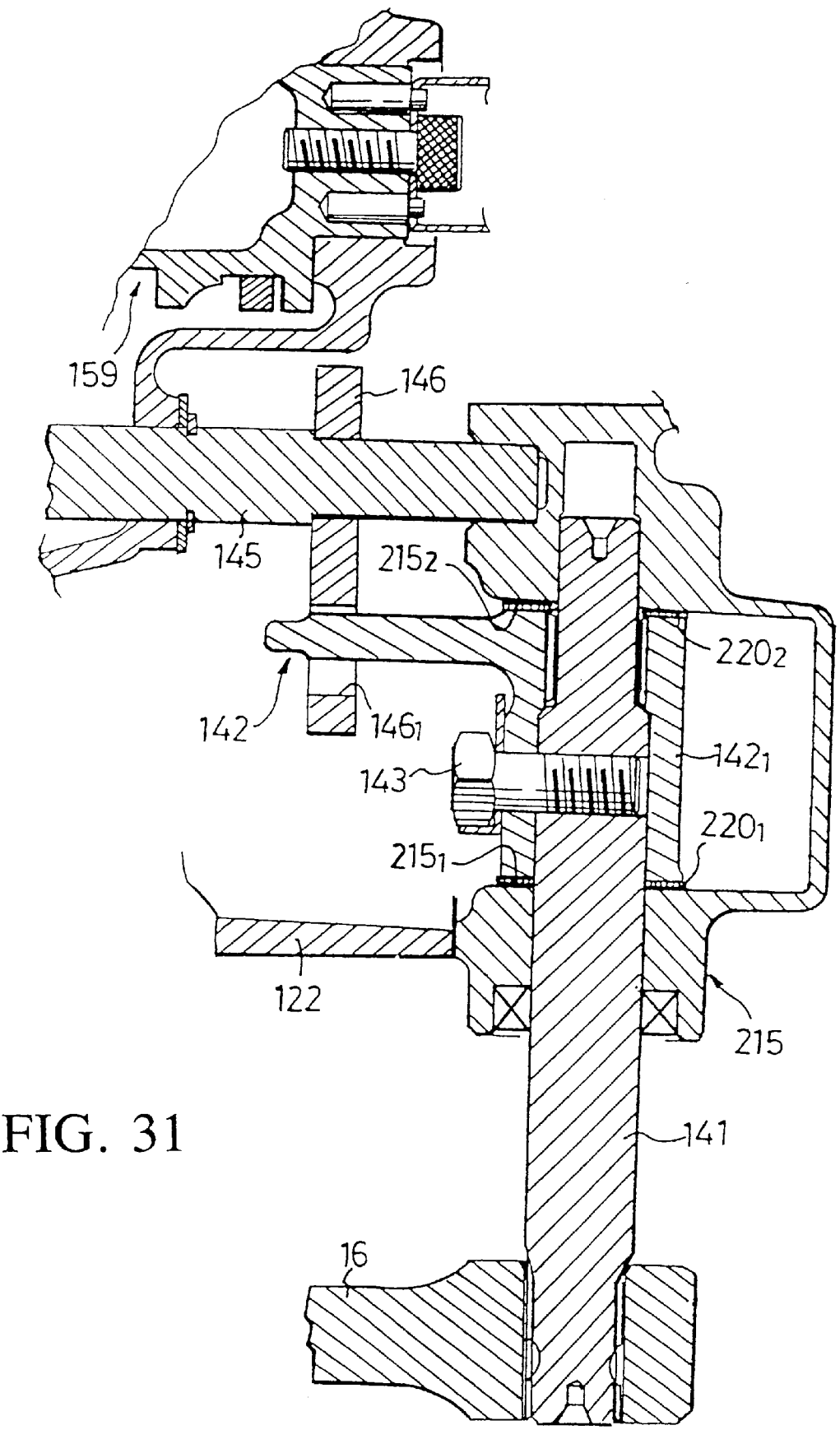
FIG. 31 is a diagram showing a change pedal shaft used in the second embodiment of the present invention.

Next, a second embodiment of a portion of the invention will be described for preventing wobbling or rattling of the change pedal shaft 141, with particular reference being made to FIG. 31.

In the first embodiment described above, the change pedal shaft 141 is biased by the spring 144 such that an end face of the collar $141_1$ of the driving arm 142 is abutted against the inner surface of the rear cover 215 to prevent wobbling of the change pedal shaft 141 (see FIG. 17). On the other hand, in this second embodiment, both end faces of the collar $142_1$ are brought into abutment against positioning faces $215_1, 215_2$ of the rear cover 215 through washers $220_1, 220_2$, respectively, to prevent axial wobbling of the change pedal shaft 141.

It should be noted that the present invention can be applied to any shaft other than the camshaft 77. Further, the step $183_2$ which is formed on the sprocket 186 side of the supporting wall 183 may instead be formed on the supporting wall opposite to the sprocket 186 side. Finally, roller bearings or needle bearings may be used instead of the ball bearings described herein.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. An assembling structure for a shaft having a sprocket attached thereto, the shaft including a first bearing and a second bearing, the sprocket being fixed to an end of the shaft adjacent to the first bearing, and an endless transmission means wound around the sprocket, the assembling structure comprising:

first and second supporting holes formed in first and second supporting walls, respectively, for supporting said first and second bearings;

a step being cut in the first supporting wall adjacent to the first supporting hole, wherein the step is cut in a loosening direction of said endless transmission means, such that prior to engaging the first bearing with said first supporting hole, the first bearing may be temporarily held on said step to put the endless transmission means onto the sprocket, and thereafter the first and second bearings may be installed in the first and second supporting holes.

2. An assembly structure for a camshaft of an engine comprising:

an engine wall, said engine wall having a first camshaft bearing receiving aperture formed therein to receive a first camshaft bearing in said aperture when said camshaft is assembled with said engine; and a recess formed adjacent to said aperture to provide support for said first camshaft bearing when said camshaft is being assembled with said engine.

3. The assembly structure for a camshaft of an engine according to claim 2, wherein the camshaft includes a sprocket attached thereto.

4. The assembly structure for a camshaft of an engine according to claim 2, wherein the camshaft includes a second camshaft bearing attached thereto.

5. The assembly structure for a camshaft of an engine according to claim 2, wherein the camshaft includes a second camshaft bearing for rotatably supporting the camshaft, a sprocket fixed to an end of the shaft adjacent to the first camshaft bearing, and an endless transmission means wound around the sprocket.

6. The assembly structure for a camshaft of an engine according to claim 2, wherein the camshaft includes a second camshaft bearing for rotatably supporting the camshaft, and said engine wall includes a second camshaft bearing receiving aperture formed therein to receive said second camshaft bearing in said second aperture when said camshaft is assembled with said engine.

7. The assembly structure for a camshaft of an engine according to claim 2, wherein the recess is crescent-shaped.

8. A method of assembling a camshaft in an engine comprising the following steps:

providing an engine wall, the engine wall having first and second camshaft bearing receiving apertures formed therein, and a recess formed adjacent to said first aperture;

providing a camshaft, the camshaft having a first bearing and a second bearing mounted thereon, the camshaft having a sprocket attached thereto;

providing an endless transmission device;

placing the camshaft in the engine with the first bearing resting in the recess;

entraining the endless transmission device around the sprocket; and moving the first bearing away from the recess and into the first aperture such that the first and second bearings are located in the first and second apertures, respectively.

9. The method for assembling a camshaft in an engine according to claim 8, wherein the step of moving the first bearing away from the recess and into the first aperture causes the endless transmission device to tighten.

10. The method for assembling a camshaft in an engine according to claim 8, wherein the sprocket is firmly attached to the camshaft prior to installing the camshaft in the engine.

* * * * *